(12) United States Patent
Pei et al.

(10) Patent No.: US 11,994,621 B2
(45) Date of Patent: May 28, 2024

(54) MOUNTING APPARATUSES FOR OPTICAL COMPONENTS IN A SCANNING LIDAR SYSTEM

(71) Applicant: Cepton Technologies, Inc., San Jose, CA (US)

(72) Inventors: Jun Pei, Saratoga, CA (US); Mark McCord, Los Gatos, CA (US); Daryoosh Rejaly, Mountain House, CA (US)

(73) Assignee: Cepton Technologies, Inc., San Jose, CA (US)

( * ) Notice: Subject to any disclaimer, the term of this patent is extended or adjusted under 35 U.S.C. 154(b) by 855 days.

(21) Appl. No.: 17/038,537

(22) Filed: Sep. 30, 2020

(65) Prior Publication Data

US 2021/0103039 A1 Apr. 8, 2021

Related U.S. Application Data

(63) Continuation of application No. 15/841,125, filed on Dec. 13, 2017, now Pat. No. 10,845,466.

(Continued)

(51) Int. Cl.
*G01S 7/481* (2006.01)
*G01S 7/4863* (2020.01)
(Continued)

(52) U.S. Cl.
CPC ........... *G01S 7/4817* (2013.01); *G01S 7/4811* (2013.01); *G01S 7/4815* (2013.01); *G01S 7/4816* (2013.01);
(Continued)

(58) Field of Classification Search
CPC .... G01S 7/4811; G01S 7/4813; G01S 7/4815; G01S 7/4817; G01S 7/4863
See application file for complete search history.

(56) References Cited

U.S. PATENT DOCUMENTS

| 4,826,269 A | 5/1989 | Streifer et al. |
| 5,057,681 A | 10/1991 | Beder |

(Continued)

FOREIGN PATENT DOCUMENTS

| CN | 103502841 A | 1/2014 |
| CN | 104698468 A | 6/2015 |

(Continued)

OTHER PUBLICATIONS

Notice of Reasons for Rejection dated Jun. 9, 2023 in related Japanese application No. 2022-114427 (18 pages).

(Continued)

*Primary Examiner* — Eric L Bolda
(74) *Attorney, Agent, or Firm* — Kilpatrick Townsend & Stockton LLP

(57) ABSTRACT

A scanning lidar system includes a first lens having a first lens center and characterized by a first optical axis and a first surface of best focus, a second lens having a second lens center and characterized by a second optical axis, a platform separated from the first lens and the second lens along the first optical axis, and an array of laser sources mounted on the platform. Each laser source of the array of laser sources has an emission surface lying substantially at the first surface of best focus of the first lens and positioned at a respective laser position. The scanning lidar system further includes an array of photodetectors mounted on the platform. Each photodetector of the array of photodetectors is positioned at a respective photodetector position that is optically conjugate with a respective laser position of a corresponding laser source.

16 Claims, 23 Drawing Sheets

Related U.S. Application Data

(60) Provisional application No. 62/438,735, filed on Dec. 23, 2016.

(51) Int. Cl.
  *G01S 7/497* (2006.01)
  *G01S 17/10* (2020.01)
  *G01S 17/42* (2006.01)
  *G01S 17/89* (2020.01)

(52) U.S. Cl.
  CPC ............ *G01S 7/4863* (2013.01); *G01S 7/497* (2013.01); *G01S 17/10* (2013.01); *G01S 17/42* (2013.01); *G01S 17/89* (2013.01)

(56) References Cited

U.S. PATENT DOCUMENTS

| | | | |
|---|---|---|---|
| 5,510,273 | A | 4/1996 | Quinn |
| 5,610,824 | A | 3/1997 | Vinson |
| 5,784,023 | A * | 7/1998 | Bluege .................. G01S 17/58 342/104 |
| 6,240,116 | B1 | 5/2001 | Lang et al. |
| 7,786,421 | B2 * | 8/2010 | Nikzad ................ H04N 25/702 250/214 R |
| 7,965,754 | B1 | 6/2011 | Saint Clair et al. |
| 8,742,325 | B1 | 6/2014 | Droz et al. |
| 8,836,922 | B1 | 9/2014 | Pennecot et al. |
| 9,086,273 | B1 | 7/2015 | Gruver et al. |
| 9,128,190 | B1 | 9/2015 | Ulrich et al. |
| 9,557,221 | B1 | 1/2017 | Manning |
| 10,690,754 | B2 | 6/2020 | Pei et al. |
| 10,845,466 | B2 | 11/2020 | Pei et al. |
| 10,955,530 | B2 | 3/2021 | Pei et al. |
| 2001/0053488 | A1 | 12/2001 | Vernackt |
| 2003/0138020 | A1 | 7/2003 | Chen |
| 2004/0141170 | A1 * | 7/2004 | Jamieson ................ G01S 17/89 356/612 |
| 2007/0058229 | A1 | 3/2007 | Hudyma et al. |
| 2007/0076186 | A1 | 4/2007 | Miyazaki et al. |
| 2007/0158493 | A1 | 7/2007 | Shapira et al. |
| 2007/0181810 | A1 | 8/2007 | Tan et al. |
| 2007/0279615 | A1 | 12/2007 | Degnan et al. |
| 2008/0002176 | A1 | 1/2008 | Krasutsky |
| 2009/0015891 | A1 | 1/2009 | Kane |
| 2012/0089299 | A1 | 4/2012 | Breed |
| 2013/0241762 | A1 | 9/2013 | Smith et al. |
| 2014/0071431 | A1 * | 3/2014 | Last ...................... G01S 7/4815 356/5.01 |
| 2015/0029571 | A1 | 1/2015 | Steele |
| 2016/0107865 | A1 | 4/2016 | Mannari et al. |
| 2016/0209648 | A1 | 7/2016 | Haddick et al. |
| 2016/0282453 | A1 | 9/2016 | Pennecot et al. |
| 2018/0017668 | A1 | 1/2018 | Cottin et al. |
| 2018/0128903 | A1 | 5/2018 | Chang |
| 2018/0180720 | A1 | 6/2018 | Pei et al. |
| 2018/0180721 | A1 | 6/2018 | Pei et al. |
| 2018/0180722 | A1 | 6/2018 | Pei et al. |

FOREIGN PATENT DOCUMENTS

| | | |
|---|---|---|
| JP | 6-222835 A | 8/1994 |
| JP | 2000-218859 A | 8/2000 |
| JP | 2002-148491 A | 5/2002 |
| JP | 2004-38051 A | 2/2004 |
| JP | 2004-85225 A | 3/2004 |
| JP | 2006-503271 A | 1/2006 |
| JP | 2007-101342 A | 4/2007 |
| JP | 2007-198951 A | 8/2007 |
| JP | 2007-214564 A | 8/2007 |
| JP | 3986928 B2 | 10/2007 |
| JP | 2008-191098 A | 8/2008 |
| JP | 2009-270856 A | 11/2009 |
| JP | 2010-32300 A | 2/2010 |
| JP | 2010-80624 A | 4/2010 |
| JP | 2012-36924 A | 2/2012 |
| JP | 2016-535269 A | 11/2016 |
| WO | 97/41460 A2 | 11/1997 |
| WO | 2015/017213 A1 | 2/2015 |

OTHER PUBLICATIONS

Second Office Action dated Dec. 3, 2021 in related Chinese Patent Application No. 201780078402.5, filed Dec. 14, 2017 (eight pages).
International Search Report and Written Opinion of the International Searching Authority in related International Application PCT/US2017/066419, dated Apr. 6, 2018 (15 pages).
Invitation to Pay Additional Fees and Partial Search Report in related International Application PCT/US2017/066419, dated Jan. 31, 2018 (two pages).
Notice of Allowance dated Feb. 6, 2020 in related U.S. Appl. No. 15/841,114, filed Dec. 13, 2017 (13 pages).
Non-Final Office Action dated Apr. 30, 2020 in related U.S. Appl. No. 15/841,121, filed Dec. 13, 2017 (26 pages).
Supplementary European Search Report in related European Patent Application No. 17884662.2 dated Jun. 3, 2020 (nine pages).
Non-Final Office Action dated Mar. 6, 2020 in related U.S. Appl. No. 15/841,125, filed Dec. 13, 2017 (17 pages).
European Office Action dated Jan. 25, 2023 in related European Patent Application No. 21 156 959.5.
First Office dated Apr. 6, 2021 in related Chinese Patent Application No. 201780078402.5, filed Dec. 14, 2017 (eleven pages).
Extended European Search Report dated Jun. 1, 2021 in related European Patent Application No. 21156959.5 (nine pages).
Communication pursuant to Article 94(3) EPC dated Mar. 23, 2023 in corresponding European application No. 17 884 662.2 (six pages).
First Office Action dated Sep. 7, 2021 in related Japanese Patent Application No. 2019-534692 (six pages).
First Office Action dated Sep. 10, 2021 in related Japanese Patent Application No. 2021-025486 (five pages).
Final Office Action dated Mar. 18, 2022 in related Japanese Patent Application No. 2021-025486 (ten pages).
Corrected Notice of Allowability dated Apr. 3, 2020 in related U.S. Appl. No. 15/841,114 (six pages).
Notice of Allowability dated May 15, 2020 in related U.S. Appl. No. 15/841,114 (three pages).
Notice of Allowance dated Jul. 8, 2020 in related U.S. Appl. No. 15/841,125 (five pages).
Notice of Decision to Grant in related Chinese Application 2017800784025 dated Mar. 3, 2022 (four pages).
European Office Action dated Oct. 25, 2021 in related European Application No. 17 884 662.2 (six pages).
Japanese Office Action dated Mar. 18, 2022 in related Japanese Patent Application No. 2019-534692 (14 pages).
International Preliminary Report on Patentability in related International Application No. PCT/US2017/066419 dated Apr. 6, 2018 (seven pages).
Notice of Allowance dated Jan. 13, 2021 in related U.S. Appl. No. 15/841,121, filed Dec. 13, 2017 (16 pages).

* cited by examiner

MOUNTING APPARATUSES FOR OPTICAL COMPONENTS IN A SCANNING LIDAR SYSTEM

CROSS-REFERENCES TO RELATED APPLICATIONS

This is a continuation application of U.S. patent application Ser. No. 15/841,125, filed on Dec. 13, 2017, now U.S. Pat. No. 10,845,466, which claims the benefit of U.S. Provisional Patent Application No. 62/438,735, filed on Dec. 23, 2016, the contents of which are incorporated by reference in their entireties.

BACKGROUND

Three-dimensional sensors can be applied in autonomous vehicles, drones, robotics, security applications, and the like. Scanning lidar sensors may achieve high angular resolutions appropriate for such applications at an affordable cost. However, scanning lidar sensors may be susceptible to external vibration sources as well as internal vibration sources. For example, when applied in an autonomous vehicle, scanning lidar sensors may be exposed to external vibrations from uneven roads, road noise, and engine noise. Internal noise from the scanning mechanism may also interfere with the operations of scanning lidars. Therefore, it may be desirable to include systems for mitigating vibrations and active vibration management systems in scanning lidar sensors.

SUMMARY

According to some embodiments of the present invention, a scanning lidar system includes a fixed frame, a first platform flexibly attached to the fixed frame, and a lens assembly. The lens assembly includes a first lens and a second lens mounted on the first platform. The first lens defines a first optical axis in a first direction and a first focal plane. The second lens defines a second optical axis substantially parallel to the first optical axis and a second focal plane. The first platform is configured to be translated in a first plane substantially perpendicular to the first direction. The scanning lidar system further includes a second platform flexible attached to the fixed frame and separated from the first platform along the first direction. The scanning lidar system further includes an electro-optic assembly that includes a first laser source and a first photodetector mounted on the second platform. The second platform is configured to be translated in a second plane substantially perpendicular to the first direction. The first laser source lies substantially at the focal plane of the first lens, and the first photodetector lies substantially at the focal plane of the second lens. The first laser source and the first photodetector are spaced apart from each other on the second platform so as to be optically conjugate with respect to each other. The scanning lidar system further includes a drive mechanism mechanically coupled to the first platform and the second platform and configured to translate the first platform and the second platform with respect to the fixed frame. The scanning lidar system further includes a controller coupled to the drive mechanism. The controller is configured to translate the first platform to a plurality of first positions in the first plane through the drive mechanism, and translate the second platform to a plurality of second positions in the second plane through the drive mechanism, such that a motion of the second platform is substantially opposite to a motion of the first platform. Each respective second position corresponds to a respective first position.

According to some other embodiments of the present invention, a method of three-dimensional imaging using a scanning lidar system includes translating a lens assembly to a plurality of first positions. The lens assembly includes a first lens defining a first optical axis in a first direction and a first focal plane, and a second lens defining a second optical axis substantially parallel to the first optical axis and a second focal plane. The method may further include translating an electro-optic assembly to a plurality of second positions. The electro-optic assembly moves in a direction substantially opposite to motion of the lens assembly. Each respective second position corresponds to a respective first position of the lens assembly. The electro-optic assembly may include a first laser source positioned substantially at the first focal plane of the first lens, and a first photodetector positioned substantially at the second focal plane of the second lens. The first laser source and the first photodetector may be spaced apart from each other so as to be optically conjugate with respect to each other. The method may further include, at each of the plurality of second positions, emitting, using the first laser source, a laser pulse, and collimating and directing, using the first lens, the laser pulse towards one or more objects. A portion of the laser pulse may be reflected off of the one or more objects. The method may further include receiving and focusing, using the second lens, the portion of the laser pulse reflected off of the one or more objects to the first photodetector, detecting, using the first photodetector, the portion of the laser pulse, and determining, using a processor, a time of flight between emitting the laser pulse and detecting the portion of the laser pulse. The method may further include constructing a three-dimensional image of the one or more objects based on the determined times of flight.

According to some embodiments of the present invention, a scanning lidar system includes an external frame, an internal frame attached to the external frame by vibration-isolation mounts, and an electro-optic assembly movably attached to the internal frame and configured to be translated with respect to the internal frame during scanning operation of the scanning lidar system.

According to some other embodiments of the present invention, a scanning lidar system includes an external frame, an internal frame attached to the external frame by vibration-isolation mounts, an electro-optic assembly movably attached to the internal frame and configured to be translated with respect to the internal frame during scanning operation of the scanning lidar system, a counterweight movably attached to the internal fame, a driving mechanism mechanically coupled to the counterweight, a first sensor couple to the internal frame for measuring an amount of motion of the internal frame, and a controller coupled to the first sensor and the driving mechanism. The controller is configured to cause a motion of the counterweight with respect to the internal frame based on the amount of motion of the internal frame measured by the first sensor.

According to some embodiments of the present invention, a scanning lidar system includes an external frame, an internal frame attached to the external frame by vibration-isolation mounts, an electro-optic assembly movably attached to the internal frame and configured to be translated with respect to the internal frame during scanning operation of the scanning lidar system, a counterweight movably attached to the internal fame, a driving mechanism mechanically coupled to the counterweight, a first sensor couple to the external frame for measuring an amount of motion of the external frame, and a controller coupled to the first sensor and the driving mechanism. The controller is configured to cause a motion of the counterweight with respect to the internal frame based on the amount of motion of the external frame measured by the first sensor.

According to some embodiments of the present invention, a scanning lidar system includes a first lens having a first lens center and characterized by a first optical axis and a first surface of best focus, and a second lens having a second lens center and characterized by a second optical axis substantially parallel to the first optical axis. The scanning lidar system further includes a platform separated from the first lens and the second lens along the first optical axis, and an array of laser sources mounted on the platform. Each laser source of the array of laser sources has an emission surface lying substantially at the first surface of best focus of the first lens and positioned at a respective laser position. The scanning lidar system further includes an array of photodetectors mounted on the platform. Each photodetector of the array of photodetectors is positioned at a respective photodetector position that is optically conjugate with a respective laser position of a corresponding laser source.

According to some embodiments of the present invention, a scanning lidar system includes a first lens having a lens center and characterized by a first optical axis and a first surface of best focus, a platform separated from the first lens along the first optical axis, and an array of laser sources mounted on the platform. Each laser source of the array of laser sources has an emission surface lying substantially at the first surface of best focus of the first lens and positioned at a respective laser position. The scanning lidar system further includes an array of photodetectors mounted on the platform. Each photodetector of the array of photodetectors is positioned at a respective photodetector position that is optically conjugate with a respective laser position of a corresponding laser source.

According to some embodiments of the present invention, a scanning lidar system includes a lens characterized by a lens center and an optical axis, a platform separated from the lens along the optical axis, and an array of laser sources mounted on the platform. Each laser source of the array of laser sources is positioned at a respective laser position, and a normal of an emission surface of each laser source points substantially toward the lens center. The scanning lidar system further includes an array of photodetectors mounted on the platform. Each photodetector of the array of photodetectors is positioned at a respective photodetector position that is optically conjugate with a respective laser position of a corresponding laser source.

DETAILED DESCRIPTION

Figure 1:
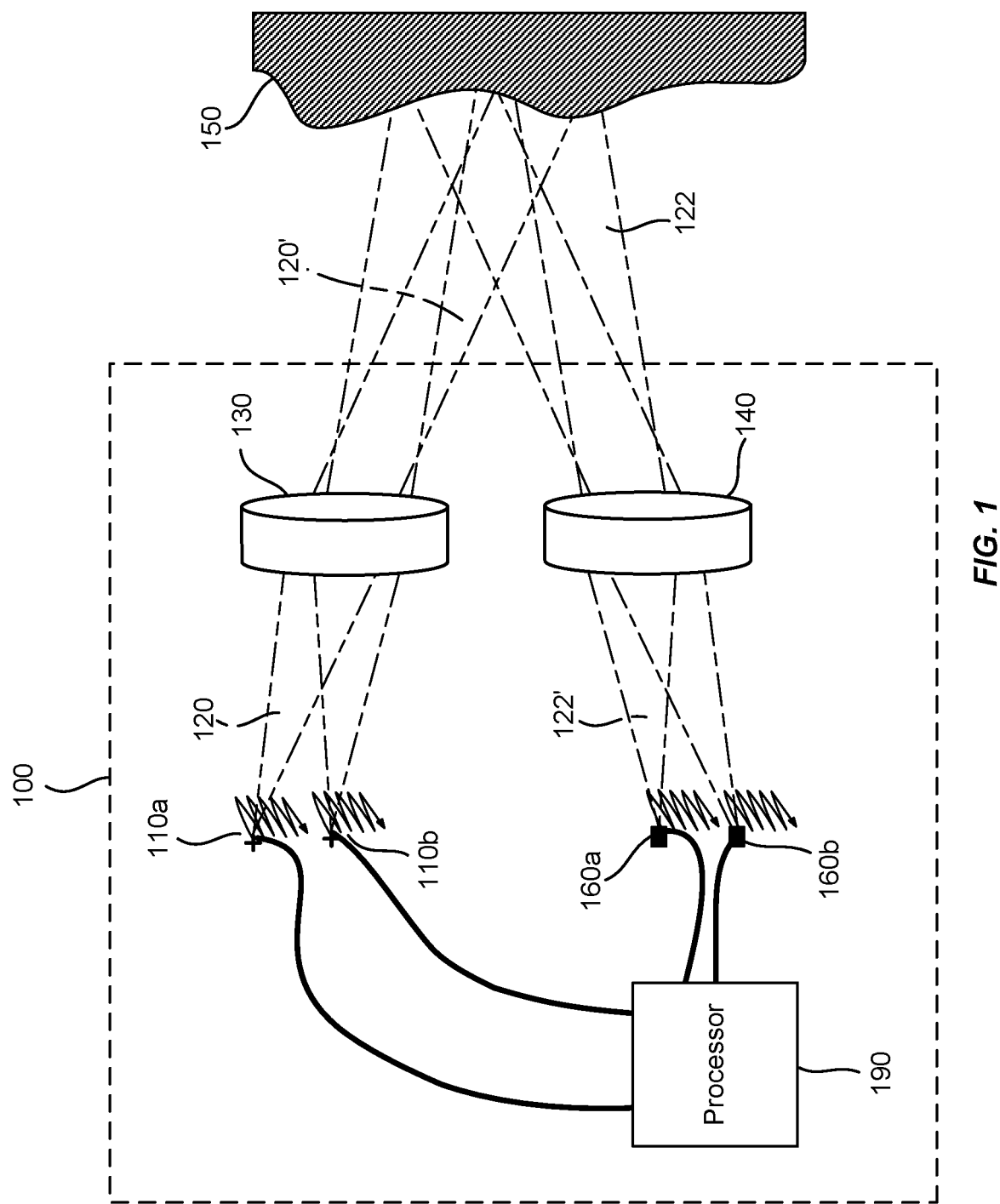
FIG. 1 illustrates schematically a lidar sensor for three-dimensional imaging according to some embodiments of the present invention.

FIG. 1 illustrates schematically a lidar sensor 100 for three-dimensional imaging according to some embodiments of the present invention. The lidar sensor 100 includes an emitting lens 130 and a receiving lens 140, both being fixed. The lidar sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the lidar sensor 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The lidar sensor 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160a is conjugate with the respective emission location of the laser source 110a.

The laser pulse 120 may be of a short duration, for example, 100 ns pulse width. The lidar sensor 100 further includes a processor 190 coupled to the laser source 110a and the photodetector 160a. The processor 190 is configured to determine a time of flight (TOF) of the laser pulse 120 from emission to detection. Since the laser pulse 120 travels at the speed of light, a distance between the lidar sensor 100 and the object 150 may be determined based on the determined time of flight.

According to some embodiments, the laser source 110a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 110a is raster scanned within a certain area in the back focal plane of the emitting lens 130, a corresponding object area on the object 150 is scanned. The photodetector 160a is raster scanned to a plurality of corresponding detection locations in the focal plane of the receiving lens 140. The scanning of the photodetector 160a is performed synchronously with the scanning of the laser source 110a, so that the photodetector 160a and the laser source 110a are always conjugate with each other at any given time.

By determining the time of flight for each laser pulse emitted at a respective emission location, the distance from the lidar sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the lidar sensor 100. Thus, a three-dimensional image of the object 150 may be constructed based on the measured distances from the lidar sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the lidar sensor 100 may be estimated based on the scanning range of the laser source 110a and the focal length of the emitting lens 130 as, $$AFOV = 2\tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the lidar sensor 100 may include multiple laser sources disposed as an array at the back focal plane of the emitting lens 130, so that a larger total AFOV may be achieved while keeping the scan range of each individual laser source relatively small. Accordingly, the lidar sensor 100 may include multiple photodetectors disposed as an array at the focal plane of the receiving lens 140, each photodetector being conjugate with a respective laser source. For example, the lidar sensor 100 may include a second laser source 110b and a second photodetector 160b, as illustrated in FIG. 1. In other embodiments, the lidar sensor 100 may include four laser sources and four photodetectors, or eight laser sources and eight photodetectors. In one embodiment, the lidar sensor 100 may include 8 laser sources arranged as a 4×2 array and 8 photodetectors arranged as a 4×2 array, so that the lidar sensor 100 may have a wider AFOV in the horizontal direction than its AFOV in the vertical direction. According to various embodiments, the total AFOV of the lidar sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110a may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The photodetector 160a may comprise a silicon avalanche photodiode, a photomultiplier, a PIN diode, or other semiconductor sensors.

The angular resolution of the lidar sensor 100 can be effectively diffraction limited, which may be estimated as, $$\theta = 1.22\lambda/D,$$

where λ is the wavelength of the laser pulse, and D is the diameter of the lens aperture. The angular resolution may also depend on the size of the emission area of the laser source 110a and aberrations of the lenses 130 and 140. According to various embodiments, the angular resolution of the lidar sensor 100 may range from about 1 mrad to about 20 mrad (about 0.05-1.0 degrees), depending on the type of lenses.

In some embodiments, the laser sources and the photodetectors may be scanned using relatively low-cost flexure mechanisms, as described below.

Figure 2:
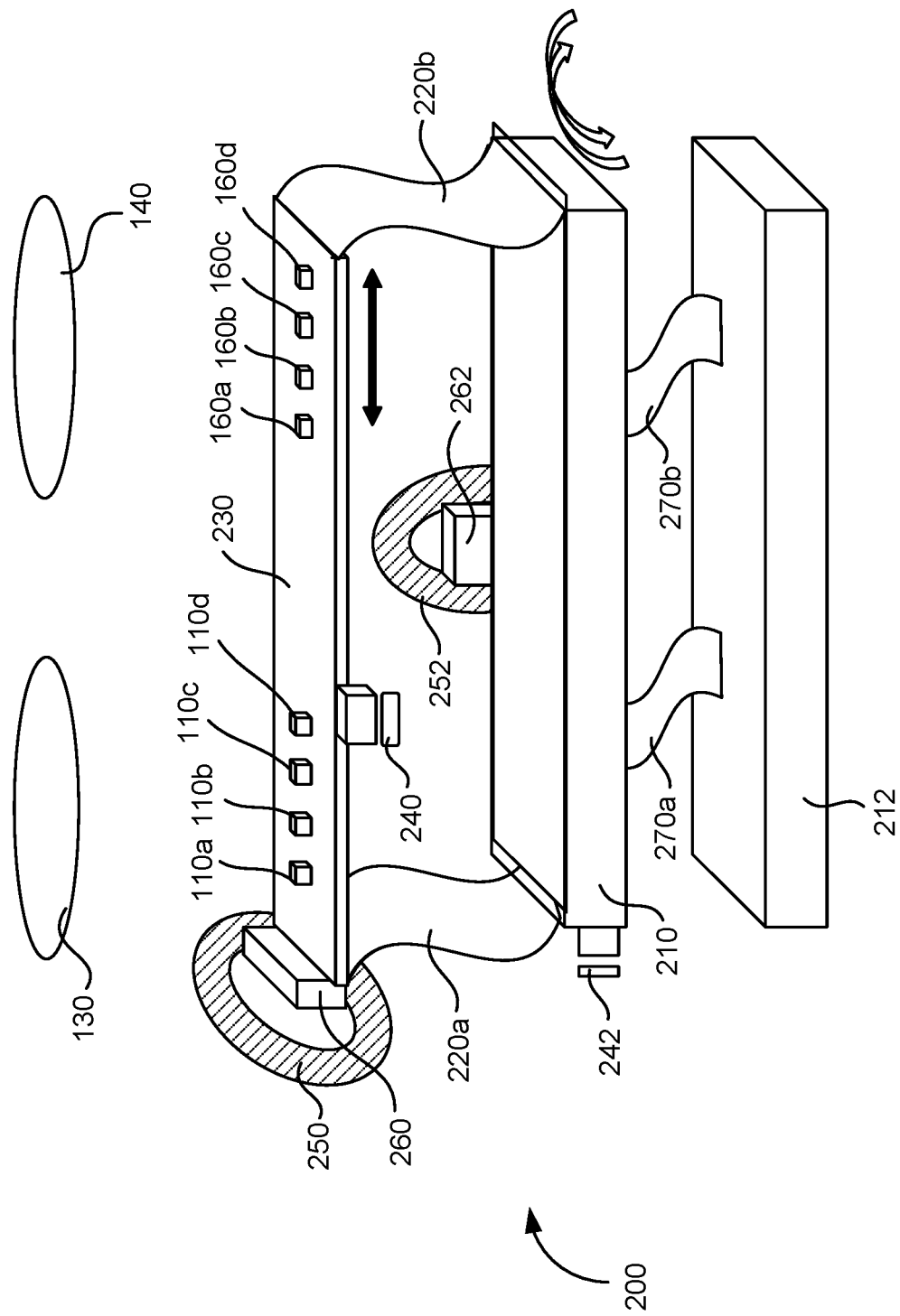
FIG. 2 illustrates schematically a flexure mechanism for scanning one or more laser sources and one or more photodetectors in a lidar sensor according to some embodiments of the present invention.

FIG. 2 illustrates schematically a flexure mechanism 200 that may be used for scanning one or more laser sources 110a-110d and one or more photodetectors 160a-160d in the lidar sensor 100 illustrated in FIG. 1, according to some embodiments of the present invention. In this example, four laser sources 110a-110d and four photodetectors 160a-160d are mounted on a same rigid platform 230. The positions of the laser sources 110a-110d and the photodetectors 160a-160d are arranged such that each laser source 110a, 110b, 110c, or 110d is spatially conjugate with a corresponding photodetector 160a, 160b, 160c, or 160d. The platform 230 is coupled to a first base plate 210 by a first flexure comprising two flexure elements 220a and 220b. The flexure elements 220a and 220b may be deflected to the left or right by using a single actuator, such as the voice coil 250 and the permanent magnet 260 as shown in FIG. 2, or by a piezoelectric actuator, and the like. In one embodiment, the first base plate 210 may be coupled to a second base plate 212 by a second flexure comprising two flexure elements 270a and 270b. The flexure elements 270a and 270b may be deflected forward or backward by using a single actuator, such as the voice coil 252 and the permanent magnet 262 as shown in FIG. 2, or by a piezoelectric actuator, and the like.

Thus, the laser sources 110a-110d and the photodetectors 160a-160d may be scanned in two dimensions in the focal planes of the emitting lens 130 and the receiving lens 140, respectively, by the left-right movements of the flexure elements 220a and 220b, and by the forward-backward movements of the flexure elements 270a and 270b. Because the laser sources 110a-110d and the photodetectors 160a-160d are mounted on the same rigid platform 230, the conjugate spatial relationship between each laser-photodetector pair is maintained as they are scanned, provided that the lens prescriptions for the emitting lens 130 and the receiving lens 140 are essentially identical. It should be appreciated that, although four laser sources 110a-110d and four photodetectors 160a-160d are shown as an example in FIG. 2, fewer or more laser sources and fewer or more photodetectors may be mounted on a single platform 230. For example, one laser source and one photodetector, or two laser sources and two photodetectors, or eight laser sources and eight photodetectors may be mounted on a single platform 230, according to various embodiments of the present invention. In one embodiment, eight laser sources may be arranged as a 4×2 array, and eight photodetectors may be arranged as a 4×2 array, all mounted on the same rigid platform 230.

In some embodiments, a first position encoder 240 may be disposed adjacent the platform 230 for detecting coordinates of the laser sources 110a-110d in the left-right direction (i.e., the x-coordinates), and a second position encoder 242 may be disposed adjacent the first base plate 210 for detecting coordinates of the laser sources 110a-110d in the forward-backward direction (i.e., the y-coordinates). The first position encoder 240 and the second position encoder 242 may input the x-y coordinates of the laser sources 110a-110d to the processor 190 to be used for constructing the three-dimensional image of the object 150.

In other embodiments, other types of flexure mechanisms may be used in a scanning lidar sensor. Additional description related to a scanning lidar sensor is provided in U.S. patent application Ser. No. 15/267,558, filed on Sep. 16, 2016, the disclosure of which is hereby incorporated by reference in its entirety for all purposes. In some embodiments, instead of using refractive lenses for collimating and focusing the laser pulses, reflective lenses or mirrors may be used for collimating and focusing the laser pulses. One of ordinary skill in the art would recognize many variations, alternatives, and modifications.

I. Scanning Apparatuses and Methods for a Lidar System

Scanning lidars, such as those described above in relation to FIGS. 1 and 2, may be susceptible to vibrations caused by the scanning mechanisms. For example, in the scanning lidar system illustrated in FIG. 2, the back and forth scanning motions of the platform 230 in the left-right direction or the forward-back direction may cause vibrations of the whole lidar system. Such vibrations can impair the performance of the lidar system. For example, three-dimensional images acquired by the lidar system may be unstable due to such vibrations. Therefore, embodiments of the present invention may employ counter-balance techniques in scanning lidar systems for mitigating vibrations.

Figure 3:
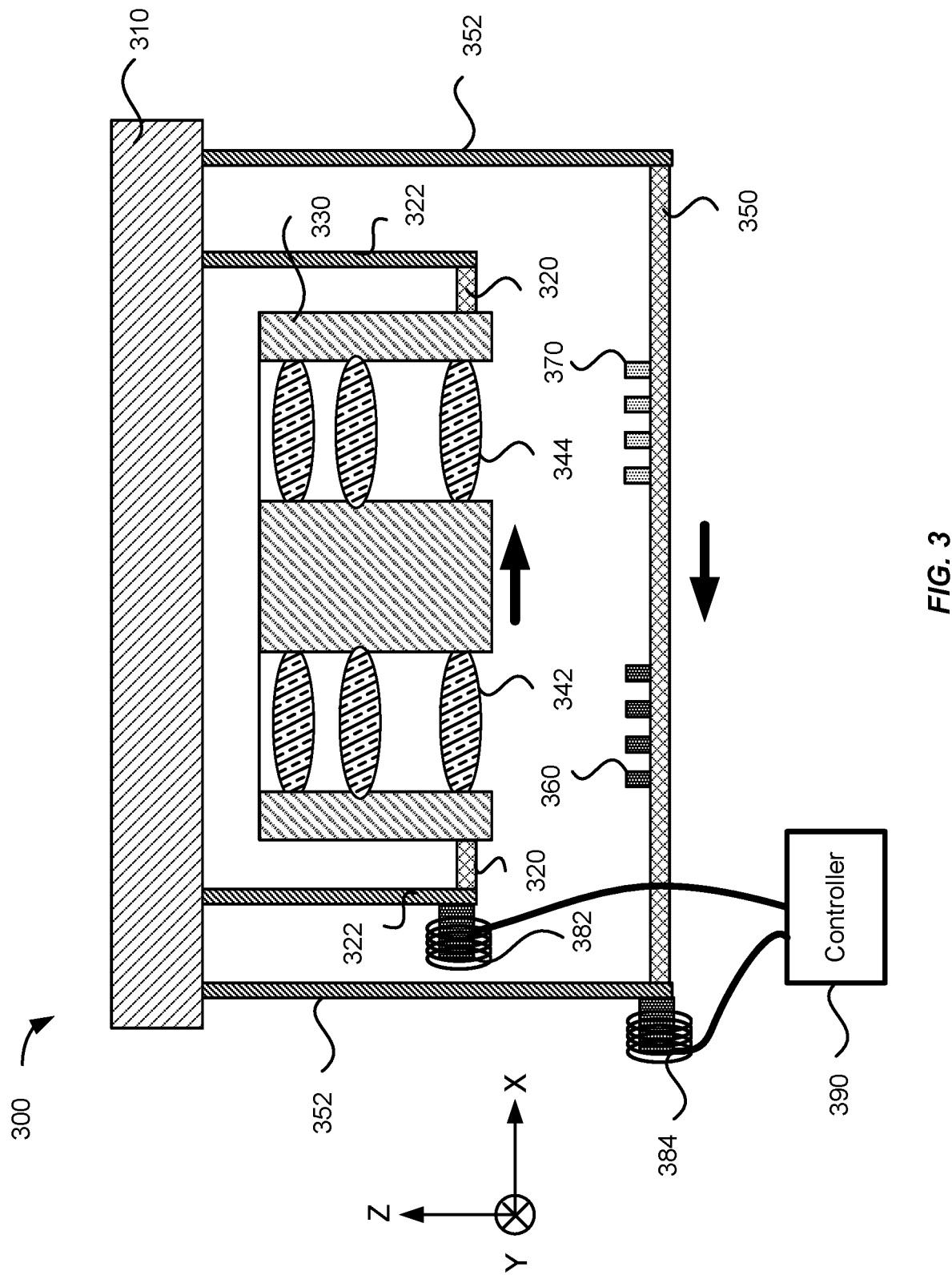
FIG. 3 illustrates a schematic cross-sectional view of a scanning lidar system according to some embodiments of the present invention.

FIG. 3 illustrates a schematic cross-sectional view of a scanning lidar system 300 according to some embodiments of the present invention. The lidar system 300 may include a fixed frame 310, a first platform 320 flexibly attached to the fixed frame 310, and a second platform 350 flexibly attached to the fixed frame 310. The lidar system 300 may further include a lens assembly attached to the first platform 320. The lens assembly may include a first lens 342 and a second lens 344 mounted in a lens mount 330. Each of the first lens 342 and the second lens 344 may include a single lens element, or multiple lens elements as illustrated in FIG. 3. The first lens 342 may define a first optical axis in a first direction (e.g., in the direction of the Z-axis) and a first focal plane (e.g., in an X-Y plane). The second lens 344 may define a second optical axis substantially parallel to the first optical axis and a second focal plane (e.g., in an X-Y plane). In some embodiments, the first lens 342 and the second lens 344 may have substantially the same focal length, so that the first focal plane and the second focal plane may be substantially coplanar.

The lidar system 300 may further include an electro-optic assembly attached to the second platform 350. The electro-optic assembly may include one or more laser sources 360 and one or more photodetectors 370 mounted on the second platform 350. The second platform 350 can be, for example, a printed circuit board including electric circuits for driving the one or more laser sources 360 and the one or more photodetectors 370. The second platform 350 may be flexibly attached to the fixed frame 310 and positioned apart from the first platform 320 in the direction of the first optical axis or the second optical axis (e.g., in the Z direction), such that the one or more laser sources 360 lie substantially at the first focal plane of the first lens 342, and the one or more photodetectors 370 lie substantially at the second focal plane of the second lens 344. Each photodetector 370 may be positioned apart from a corresponding laser source 360 on the second platform 350 so as to be optically conjugate with respect to each other, as described above.

In some embodiments, the first platform 320 may be flexibly attached to the fixed frame 310 via a first flexure 322, such that the first platform 320 may be translated in a first plane (e.g., an X-Y plane) using a first actuator 382. The second platform 350 may be flexibly attached to the fixed frame 310 via a second flexure 352, such that the second platform 350 may be translated in a second plane (e.g., an X-Y plane) using a second actuator 384. Each of the first actuator 382 and the second actuator 384 may comprise a voice coil and a magnet, a piezo motor, or the like.

The lidar system 300 may further include a controller 390 coupled to the first actuator 382 and the second actuator 384. The controller may be configured to translate the first platform 320 to a plurality of first positions in the first plane through the first actuator 382, and to translate the second platform 350 to a plurality of second positions in the second plane through the second actuator 384. Each respective second position of the second platform 350 may correspond to a respective first position of the first platform 320. In some embodiments, the motion of the second platform 350 may be substantially opposite to the motion of the first platform 320, as illustrated by the arrows in FIG. 3. In this manner, any vibration caused by the motion of the lens assembly may cancel any vibration caused by the motion of the electric-optic assembly to certain degree. Therefore, the lidar system 300 may impart a minimal net vibration to an external frame.

In some embodiments, the first platform 320 and the second platform 350 are translated with respect to each other such that a momentum of the lens assembly and a momentum of the electro-optic assembly substantially cancel each other. For example, the amount of motion of the first platform 320 may be inversely proportional to a mass of the lens assembly, and the amount of the motion of the second platform 350 may be inversely proportional to a mass of the electro-optic assembly. In this manner, the lidar system 300 may impart a negligible net vibration to an external frame.

Figure 4:
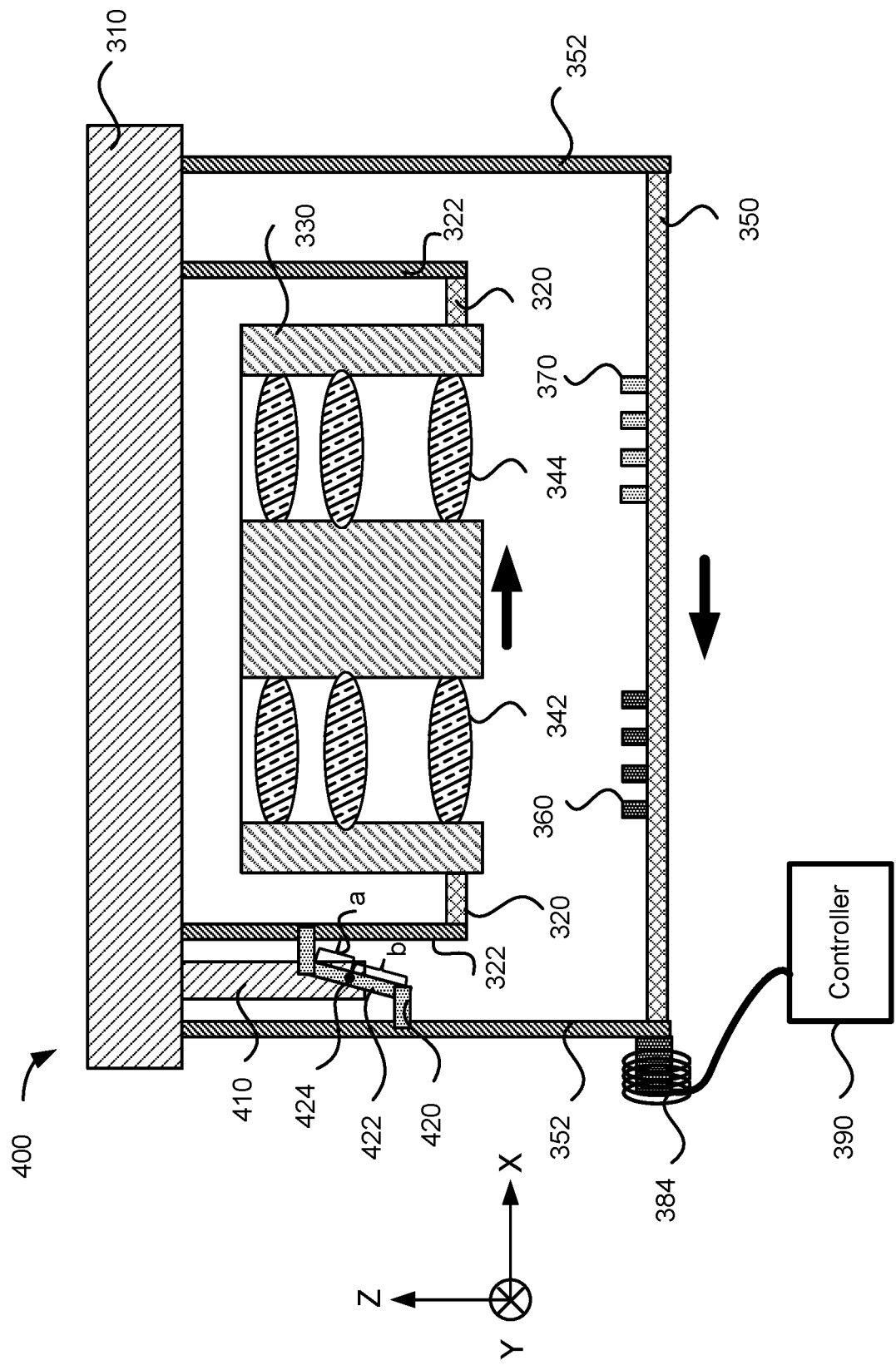
FIG. 4 illustrates a schematic cross-sectional view of a scanning lidar system according to some other embodiments of the present invention.

FIG. 4 illustrates a schematic cross-sectional view of a scanning lidar system 400 according to some other embodiments of the present invention. The lidar system 400 is similar to the lidar system 300 illustrated in FIG. 3, but may further include a post 410 attached to the fixed frame 310 and a linkage member 420 attached to the post 410. The linkage member 420 may mechanically couple the first flexure 322 and the second flexure 352 to each other so as to facilitate reciprocal motions between the first platform 320 and the second platform 350. In some embodiments, a single actuator 384 may be coupled to either the first platform 320 or the second platform 350 for controlling both the motion of the first platform 320 and the motion of the second platform 350 through the linkage member 420.

The linkage member 420 may be configured to force the first platform 320 and the second platform 350 to move in opposite directions. For example, the linkage member 420 may include an arm 422 attached to the post 410 at a pivot point 424, as illustrated in FIG. 4. As the second platform 350 is translated through the second flexure 352 using the actuator 384, the arm 422 may rotate about the pivot point 424, which may in turn cause the first platform 320 to move in an opposite direction with respect to the motion of the second platform 350 through the first flexure 322. The linkage member 420 may pivot about the pivot point 424 by means of a bearing or a flexure attachment, which may allow pivot motions without adding frictional losses. The arm 422 of the linkage member 420 may also be attached to the first platform 320 and the second platform 350 by means of bearings or flexures. It should be noted that although the actuator 384 is depicted as attached to the second platform 350 in FIG. 4, the actuator 384 may be attached to the first platform 320 in some other embodiments, such that a motion of the first platform 320 may cause a reciprocal motion of the second platform 350 through the linkage member 420.

In some embodiments, the linkage member may be configured such that a rate of motion of the first platform 320 is substantially inversely proportional to the mass of the lens assembly, and a rate of motion of the second platform 350 is substantially inversely proportional to the mass of the electro-optic assembly, so that a momentum of the lens assembly and a momentum of the electro-optic assembly substantially cancel each other. Therefore, the lidar system 300 may impart a negligible net vibration to an external frame. For example, as illustrated in FIG. 4, the pivot point 424 may be positioned such that a ratio of the distance a from the pivot point 424 to the end of the arm 422 that is attached to the first flexure 322 and the distance b from the pivot point 424 to the other end of the arm 422 that is attached to the second flexure 352 may be inversely proportional to a ratio of the mass of the lens assembly and the mass of the electro-optic assembly.

Figure 5:
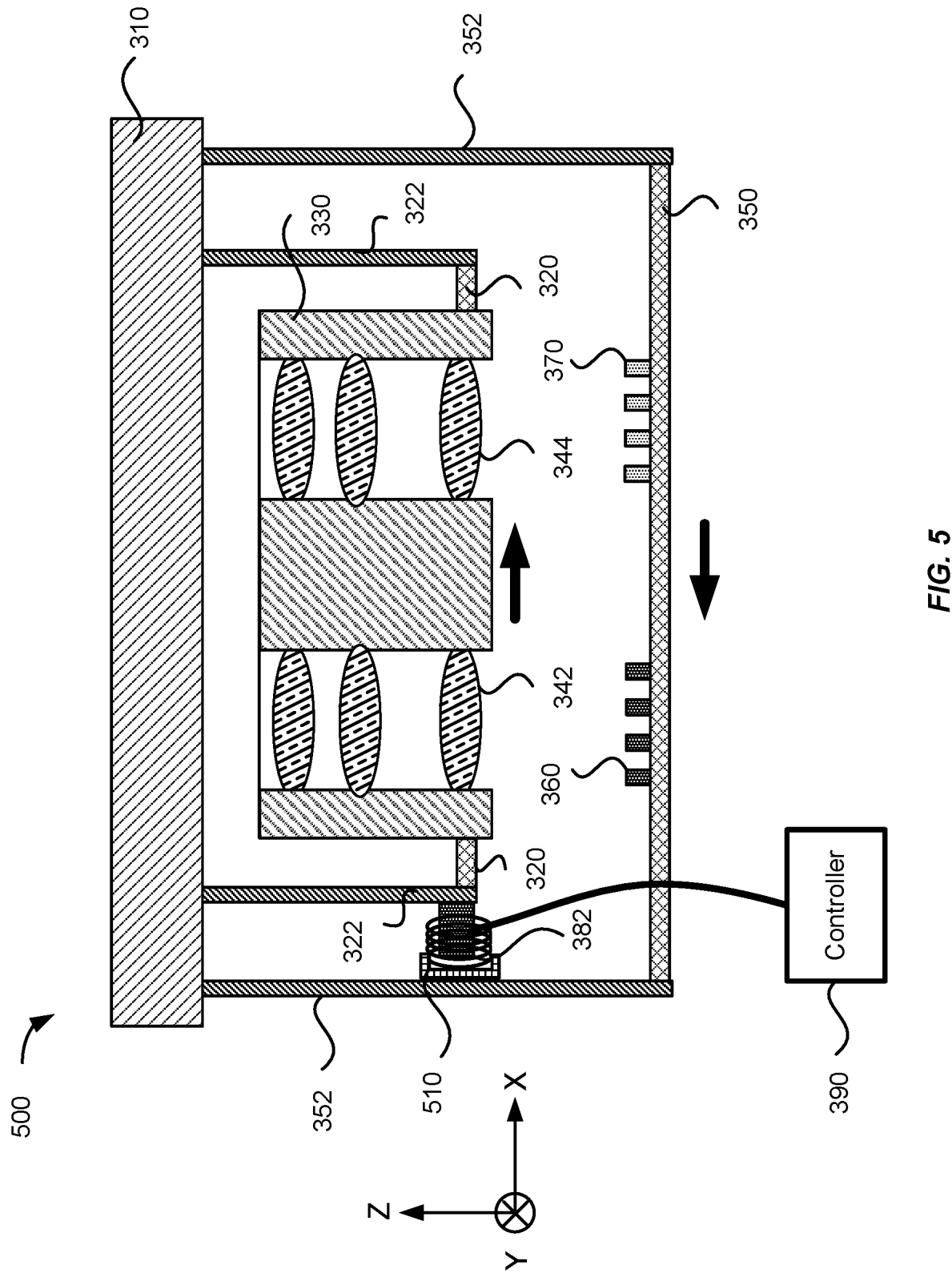
FIG. 5 illustrates a schematic cross-sectional view of a scanning lidar system according to some further embodiments of the present invention.

FIG. 5 illustrates a schematic cross-sectional view of a scanning lidar system 500 according to some further embodiments of the present invention. The lidar system 500 is similar to the lidar system 300 illustrated in FIG. 3, but here the first platform 320 and the second platform 350 are coupled to each other via the actuator 382. The actuator 382 may be configured to cause the first platform 320 and the second platform 350 to move in opposite directions. For example, the actuator 382 may include a voice coil and a first magnet attached to the first flexure 322, as well as a second magnet 510 attached to the second flexure 352. Activation of the voice coil may cause the first platform 320 to move in one direction and the second platform 350 to move in the opposite direction, as illustrated by the arrows in FIG. 5.

Figure 6:
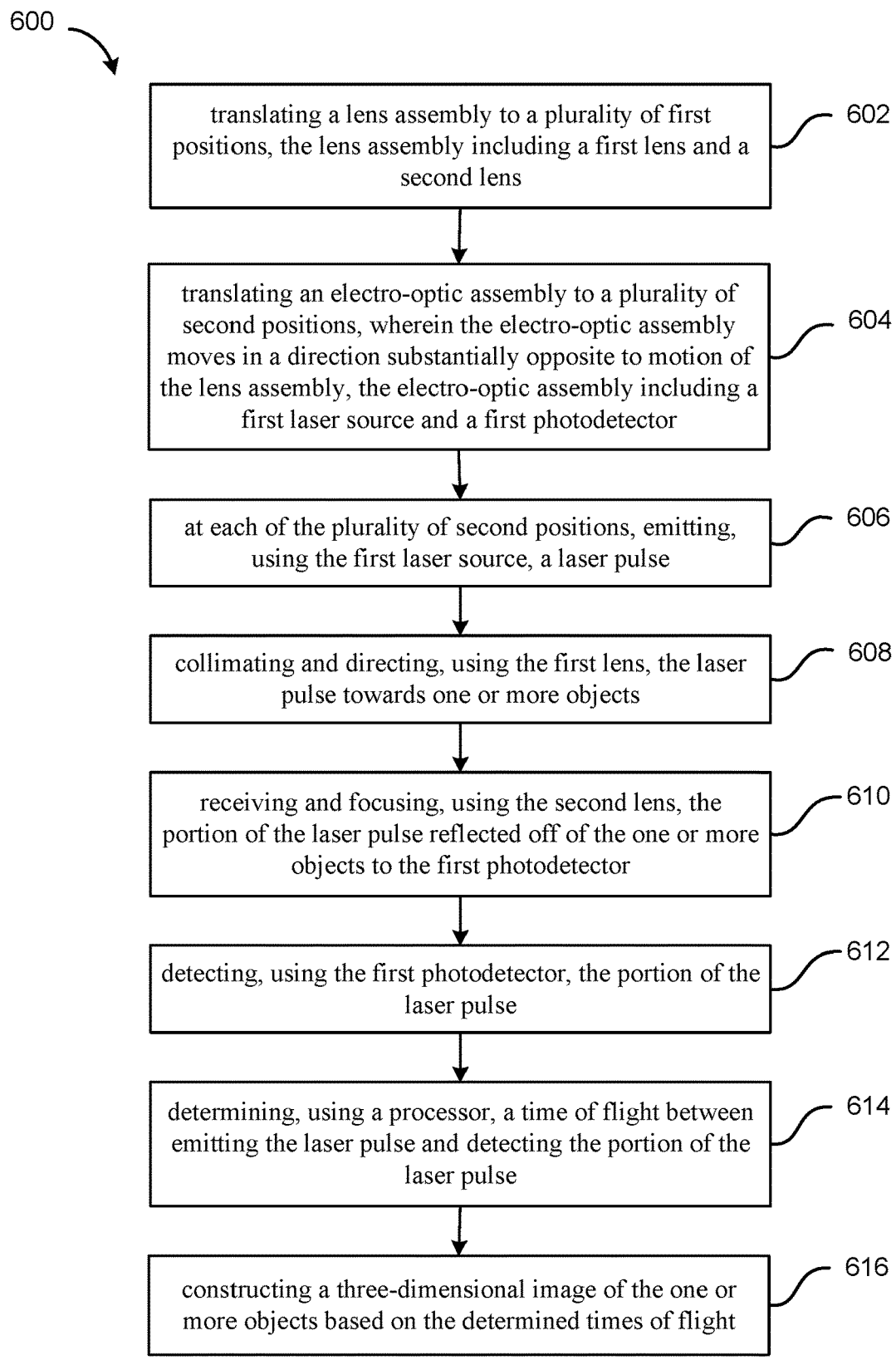
FIG. 6 is a simplified flowchart illustrating a method of three-dimensional imaging using a scanning lidar system according to some embodiments of the present invention.

FIG. 6 is a simplified flowchart illustrating a method 600 of three-dimensional imaging using a scanning lidar system according to some embodiments of the present invention. The method 600 may include, at 602, translating a lens assembly to a plurality of first positions. The lens assembly may include a first lens defining a first optical axis in a first direction and a first focal plane, and a second lens defining a second optical axis substantially parallel to the first optical axis and a second focal plane.

The method 600 may further include, at 604, translating an electro-optic assembly to a plurality of second positions, wherein the electro-optic assembly moves in a direction substantially opposite to motion of the lens assembly. Each respective second position corresponds to a respective first position of the lens assembly. The electro-optic assembly may include a first laser source positioned substantially at the first focal plane of the first lens, and a first photodetector positioned substantially at the second focal plane of the second lens. The first laser source and the first photodetector are spaced apart from each other so as to be optically conjugate with respect to each other.

The method 600 may further include, at 606, at each of the plurality of second positions, emitting, using the first laser source, a laser pulse; and at 608, collimating and directing, using the first lens, the laser pulse towards one or more objects. A portion of the laser pulse may be reflected off of the one or more objects. The method 600 further includes, at 610, receiving and focusing, using the second lens, the portion of the laser pulse reflected off of the one or more objects to the first photodetector; at 612, detecting, using the first photodetector, the portion of the laser pulse; and at 614, determining, using a processor, a time of flight between emitting the laser pulse and detecting the portion of the laser pulse. The method 600 further includes, at 616, constructing a three-dimensional image of the one or more objects based on the determined times of flight.

In some embodiments, the lens assembly and the electro-optic assembly may be translated with respect to each other such that a momentum of the lens assembly and a momentum of the electro-optic assembly substantially cancel each other. In some embodiments, the lens assembly and the electro-optic assembly may be mechanically coupled to each other via a linkage member so as to facilitate reciprocal motions between the lens assembly and the electro-optic assembly, and translating the lens assembly and translating the electro-optic assembly are performed through an actuator coupled to one of the lens assembly or the electro-optic assembly. In some other embodiments, the lens assembly and the electro-optic assembly may be mechanically coupled to each other via an actuator, and translating the lens assembly and translating the electro-optic assembly are performed through the actuator.

In some embodiments, translating the lens assembly may include raster scanning the lens assembly in one dimension, and translating the electro-optic assembly may include raster scanning the electro-optic assembly in one dimension. In some other embodiments, translating the lens assembly may include raster scanning the lens assembly in two dimensions, and translating the electro-optic assembly may include raster scanning the electro-optic assembly in two dimensions.

It should be appreciated that the specific steps illustrated in FIG. 6 provide a particular method of performing three-dimensional imaging using a lidar system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

II. Systems for Vibration Cancellation in a Lidar System

As discussed above, scanning lidar systems may be susceptible to external vibrations as well as internal vibrations. According to some embodiments of the present invention, a lidar system may utilize vibration isolation mounts and active vibration management systems to mitigate effects of vibrations.

Figure 7:
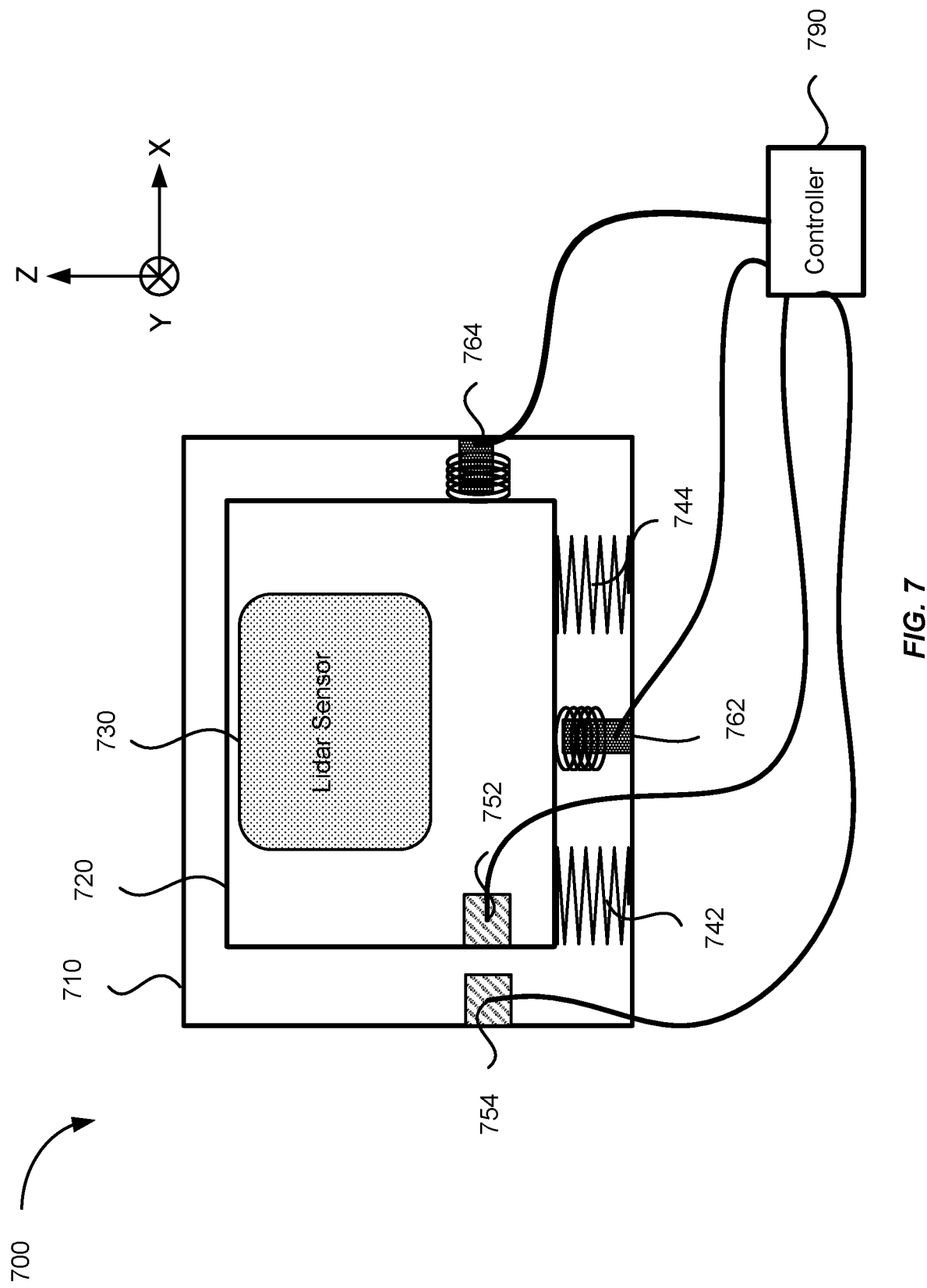
FIG. 7 illustrates schematically a system for vibration management in a scanning lidar sensor according to some embodiments of the present invention.

FIG. 7 illustrates schematically a system 700 for vibration management in a scanning lidar sensor according to some embodiments of the present invention. The system 700 may include an external frame 710 and an internal frame 720. A lidar sensor 730 may be attached to the internal frame 720. The lidar sensor 730 may include moving parts for scanning. For example, the lidar sensor 730 may include a lens assembly and an electro-optic assembly, either or both of which may be translated with respect to the internal frame 720, similar to the lidar sensors illustrated in FIGS. 1-5. The internal frame 720 can be a housing for the lidar sensor. The external frame 710 can be a vehicle, a drone, or the like where the lidar sensor is utilized for three-dimensional sensing. For example, in an autonomous vehicle, the external frame 710 may be a front bumper of the vehicle on which the internal frame 720 of the lidar sensor 730 is mounted. The external frame 710 may also be a housing larger in size than the internal frame 720. In some embodiments, the internal frame 720 may be attached to the external frame 710 using vibration isolation mounts 742 and 744. The vibration isolation mounts 742 and 744 may include rubber dampers, springs, or other types of shock absorbers.

The system 700 may further include active vibration management mechanisms. In some embodiments, the system 700 may include a first sensor 752 coupled to the internal frame 720 for measuring residual motions of the internal frame 720 caused by external vibrations. The first sensor 752 may also be used to measure motion and vibration resulting from the internal scanning mechanism of the lidar sensor 730. The first sensor 752 may be referred to as an internal sensor. The first sensor 752 may comprise an accelerometer that can measure motions along one axis, two axes, or three axes (e.g., along the X-, Y-, and/or Z-axes). In some other embodiments, the first sensor 752 may comprise a displacement sensor, such as an encoder, a capacitive sensor, a Hall sensor, or the like.

The system 700 may further include one or more actuators 762 and 764 coupled to the internal frame 720 for moving the internal frame 720 with respect to the external frame 710. For example, a first actuator 762 may be configured to move the internal frame 720 up or down (e.g., along the Z-axis) with respect to the external frame 710, and a second actuator 764 may be configured to move the internal frame 720 forward or backward (e.g., along the X-axis) with respect to the external frame 710, as illustrated in FIG. 7. Similarly, a third actuator (not shown in FIG. 7) may be configured to move the internal frame 720 left or right (e.g., along the Y-axis) with respect to the external frame 710. Each of the first actuator 762 and the second actuator 764 may comprise a voice coil motor, a piezo motor, or the like.

The system 700 may further include a controller 790 coupled to the first sensor 752, the first actuator 762, and the second actuator 764 The controller 790 may be configured to provide "feedback" compensation for the residue motions of the internal frame 720 caused by external or internal vibrations. For example, the controller 790 may cause the internal frame 720 to be translated up or down (e.g., along the Z-axis) through the first actuator 762, or be translated forward or back (e.g., along the X-axis) through the second actuator 764, based on the amount of motion of the internal frame 720 measured by the first sensor 752.

The system 700 may further include a second sensor 754 coupled to the external frame 710 for measuring vibration motions of the external frame 710 before such motions are attenuated by the vibration isolation mounts 742 and 744. The second sensor 754 may be referred to as an external sensor. For example, when applied in an autonomous vehicle, the vibration motions of the external frame 710 can be due to uneven roads, road noise, engine noise, and the like, as well as internal noise from the scanning mechanism of the lidar system. The second sensor 754 may comprise an accelerometer that can measure motions along one axis, two axes, or three axes (e.g., along the X-, Y-, and/or Z-axes). In some other embodiments, the second sensor 754 may comprise a displacement sensor, such as an encoder, a capacitive sensor, a Hall sensor, or the like.

In some embodiments, the controller 790 may also be coupled to the second sensor 754 and configured to provide "feedforward" compensation based on the amount of motion of the external frame 710 measured by the second sensor 754. Modeling of the system response to external vibrations and resonances may be used to control the feedforward corrections. Feedforward corrections are proactive, and therefore may respond faster as compared to feedback corrections, which are reactive.

In some cases, translational motions of the internal frame 720 may not adequately compensate for large motions caused by the vibration of the external frame 710. For example, when a car hits a large pot hole, the car may have a large rocking motion in its pitch (e.g., a rotation about the Y-axis). If left uncompensated, this rocking motion may cause a lidar to aim upward toward the sky or downward toward the ground, instead of aiming toward the front of the car. Therefore, in some embodiments, the internal frame 720 may be tilted up or down (and/or left or right) to compensate for such tilting motions of the external frame 710. For example, if the first actuator 762 is positioned off-center between the vibration isolation mounts 742 and 744, the internal frame 720 may be tilted up or down about the Y-axis through the first actuator 762.

In some embodiments, the signals from the first sensor 752 and/or the second sensor 754 may be used for image stabilization, either mechanically or digitally. Mechanical image stabilization for the most part may be achieved through vibration cancellation as described above. However, due to the complexity of mechanical vibration modes, the controller 790 may utilize a model or empirical approach to its feedback control in order to more effectively provide image stabilization. Additionally, signals from the first sensor 752 (and the second sensor 754 if available) may be sent to an image processing unit for the lidar sensor 730. Residual errors detected by the first sensor 752 and/or the second sensor 754 can be used by the image processing unit to digitally shift the image, thus providing a digital image stabilization function.

Figure 8:
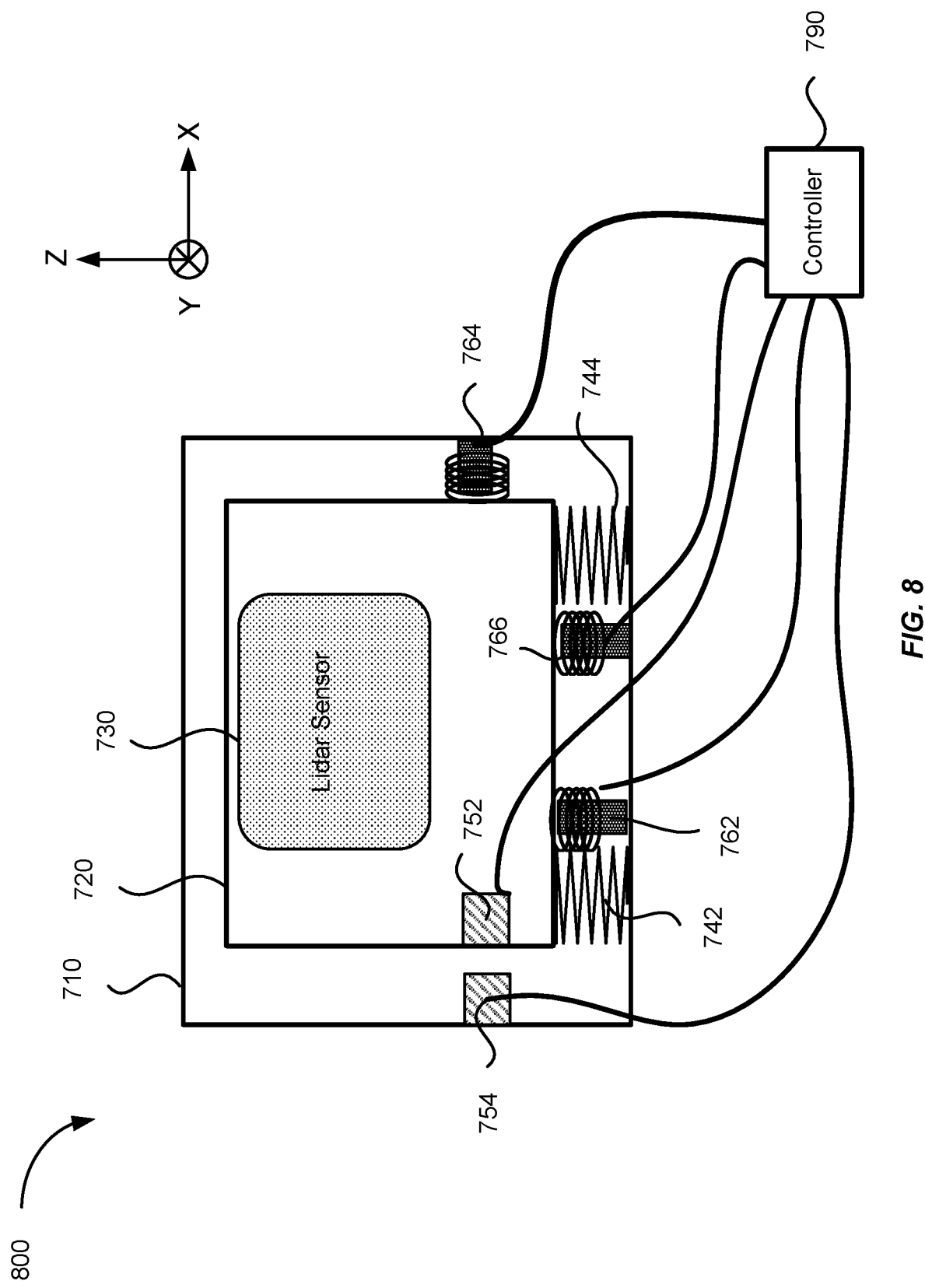
FIG. 8 illustrates schematically a system for vibration management in a scanning lidar sensor according to some other embodiments of the present invention.

FIG. 8 illustrates schematically a system 800 for vibration management in a scanning lidar sensor according to some other embodiments of the present invention. The system 800 is similar to the system 700 illustrated in FIG. 7, but may further include a third actuator 766 positioned apart from the first actuator 762. The controller may be further coupled to the third actuator 766, and configured to compensate pitch motions (e.g., rotations about the Y-axis) of the external frame 710 by pushing the first the internal frame 720 by the first actuator 762 and pulling the internal frame 720 by the third actuator 766, or vice versa. Similarly, the system 800 may further include a fourth actuator (not shown in FIG. 8) positioned apart from the second actuator 764 (e.g., along the Y-axis), for compensating the yaw motions (e.g., rotations about the Z-axis) of the external frame 710.

Figure 9:
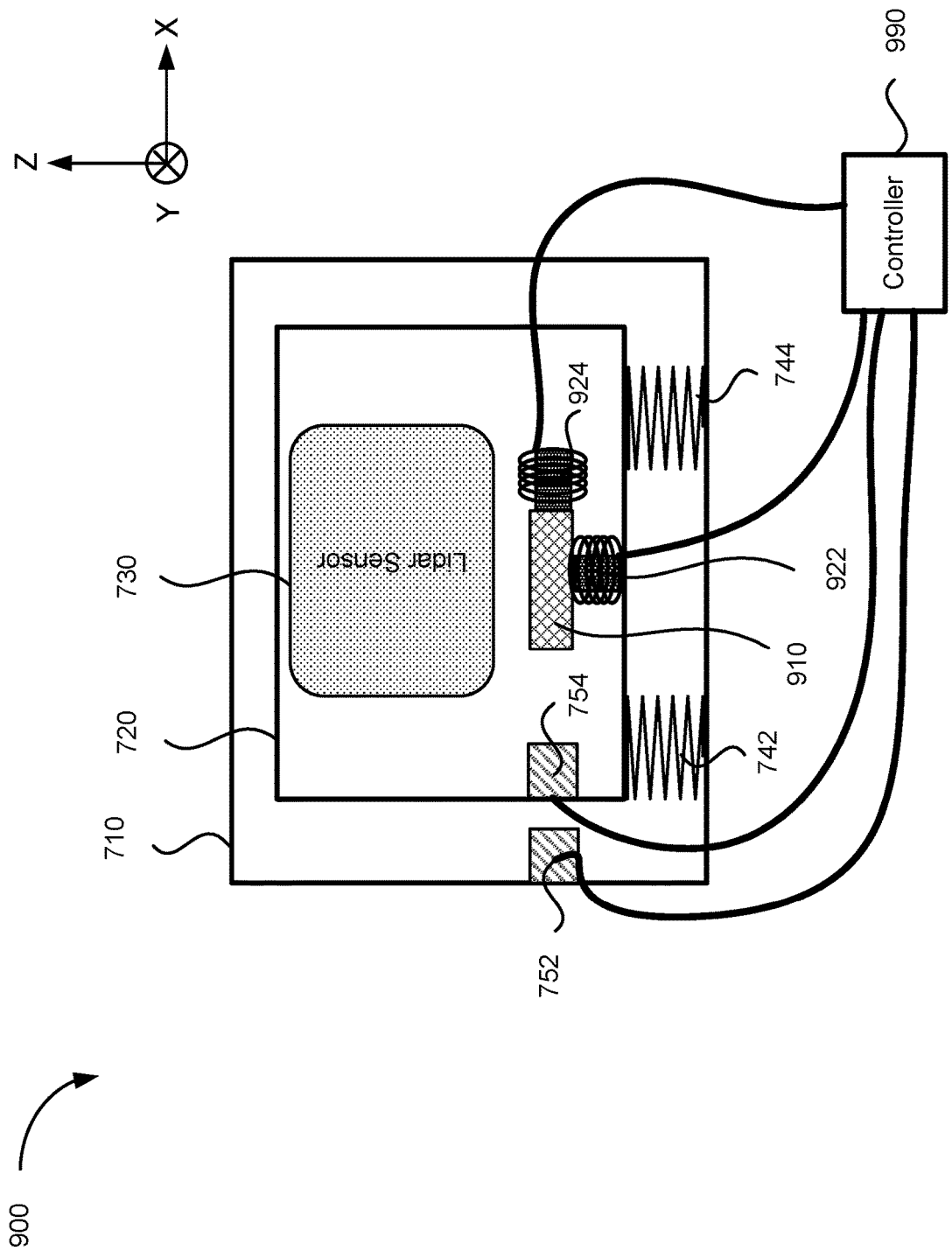
FIG. 9 illustrates schematically a system for vibration management in a scanning lidar sensor according to some embodiments of the present invention.

According to some other embodiments of the present invention, counter-moving masses may be used for active vibration management. FIG. 9 illustrates schematically a system 900 for vibration management in a scanning lidar sensor according to some embodiments of the present invention. The system 900 may include a counter-mass 910 movably attached to the internal frame 720. The system 900 may further include a first actuator 922 mechanically coupled to the counter-mass 910 for moving the counter-mass 910 along the Z-axis (e.g., up or down). The first actuator 922 may comprise a voice coil motor, a piezo motor, or the like.

A controller 990 may be coupled to the first sensor 754 and the first actuator 922, and configured to control the first actuator 922 based on the amount of motion of the internal frame 720 as measured by the first sensor 754. For example, in response to the first sensor 754 sensing an upward motion (e.g., along the positive Z direction) of the internal frame 720, the controller 990 may cause the counter-mass 910 to move downward (e.g., along the negative Z direction) with respect to the internal frame 720, so that a net movement of the internal frame 720 may be substantially zero. In some embodiments, the counter-mass 910 may preferably be positioned near the center of mass of the internal frame 720 including the mass of the lidar sensor 730 and other associated parts.

In some embodiments, the system 900 may also include a second actuator 924 mechanically coupled to the counter-mass 910 for moving the counter-mass 910 along the X-axis (e.g., forward or backward). The controller 990 may be further coupled to the second actuator 924 and configured to cause the counter-mass 910 to move along the X-axis based on the amount of motion of the internal frame 720 along the X-axis as measured by the first sensor 754, so as to result in a nearly zero net motion of the internal frame 720 along the X-axis. Similarly, the system 900 may also include a third actuator (not shown in FIG. 9) for moving the counter-mass 910 along the Y-axis.

In some embodiments, the controller 990 may also be coupled to the second sensor 752 (i.e., the external sensor) and configured to provide "feedforward" compensation of the external vibrations by moving the counter-mass 910 accordingly based on the amount of motions of the external frame 710 as measured by the second sensor 754. As discussed above, feedforward corrections may respond faster than feedback corrections.

Figure 10:
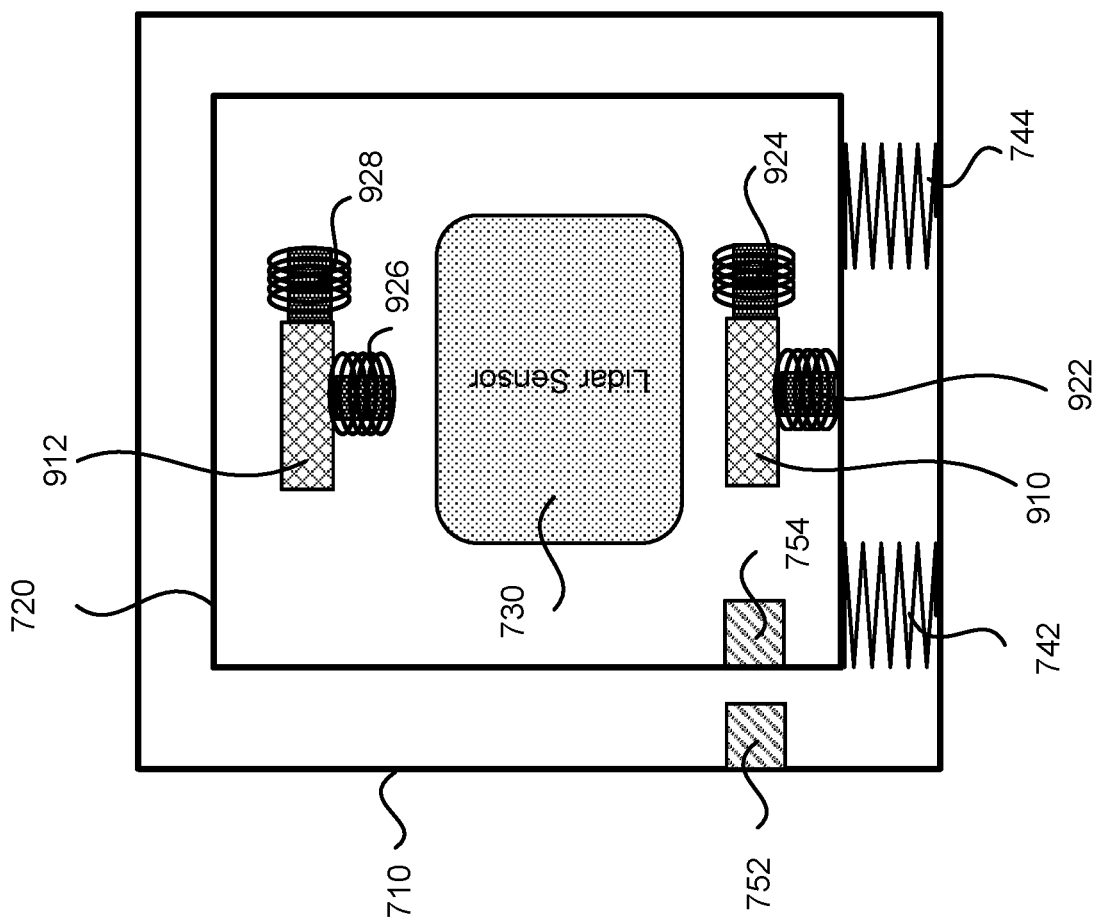
FIG. 10 illustrates schematically a system for vibration management in a scanning lidar sensor according to some other embodiments of the present invention.

In some embodiments, more than one counter-masses may be deployed for active vibration management. FIG. 10 illustrates schematically a system 1000 for vibration management in a scanning lidar sensor according to some other embodiments of the present invention. Similar to the system 900 illustrated in FIG. 9, the system 1000 may include a first counter-mass 910 movably attached to the internal frame 720, a first actuator 922 mechanically coupled to the first counter-mass 910 for moving the first counter-mass 910 along the Z-axis, and a second actuator 924 mechanically coupled to the first counter-mass 910 for moving the first counter-mass 910 along the X-axis. In addition, the system 1000 may include a second counter-mass 912 movably attached to the internal frame 720, a third actuator 936 mechanically coupled to the second counter-mass 912 for moving the second counter-mass 912 along the Z-axis, and a fourth actuator 938 mechanically coupled to the second counter-mass 912 for moving the second counter-mass 912 along the X-axis. The system 1000 may be able to account for the fact that a single actuator may not act in line with the center of mass of the internal frame 720. Also, the relative movements of the first counter-mass 910 and the second counter-mass 912 with respect to each other may cause a torsional motion of the internal frame 720, such as a rotation about the Y-axis (i.e., a pitch motion) or a rotation about the X-axis (i.e., a roll motion) of the internal frame 720, so as to compensate for torsional vibrations.

III. Mounting Apparatuses for Optical Components in a Scanning Lidar System

According to some embodiments of the present invention, a plurality of laser sources and/or a plurality of photodetectors may be mounted on a platform in a configuration that accounts for the field curvature of a lens. Field curvature, also known as "curvature of field" or "Petzval field curvature," describes the optical aberration in which a flat object normal to the optical axis cannot be brought properly into focus on a flat image plane. Consider a single-element lens system for which all planar wave fronts are focused to a point at a distance f from the lens, f being the focal length of the lens. Placing this lens the distance f from a flat image sensor, image points near the optical axis may be in perfect focus, but rays off axis may come into focus before the image sensor. This may be less of a problem when the imaging surface is spherical. Although modern lens designs, for example lens designs that utilize multiple lens elements, may be able to minimize field curvature (or to "flatten the field") to a certain degree, some residue field curvature may still exist.

In the presence of field curvature of a lens, if a plurality of laser sources 110a-110d are mounted on a planar surface, such as illustrated in FIG. 2, laser pulses emitted by laser sources that are positioned off from the optical axis may not be perfectly collimated by the emission lens 130 due to field curvature of the emission lens 130. Similarly, if a plurality of photodetectors 160a-160d are mounted on a planar surface as illustrated in FIG. 2, the laser pulses reflected off of objects may not be brought into perfect focus by the receiving lens 140 at the photodetectors that are positioned off from the optical axis due to field curvature of the receiving lens 140.

Figure 11:
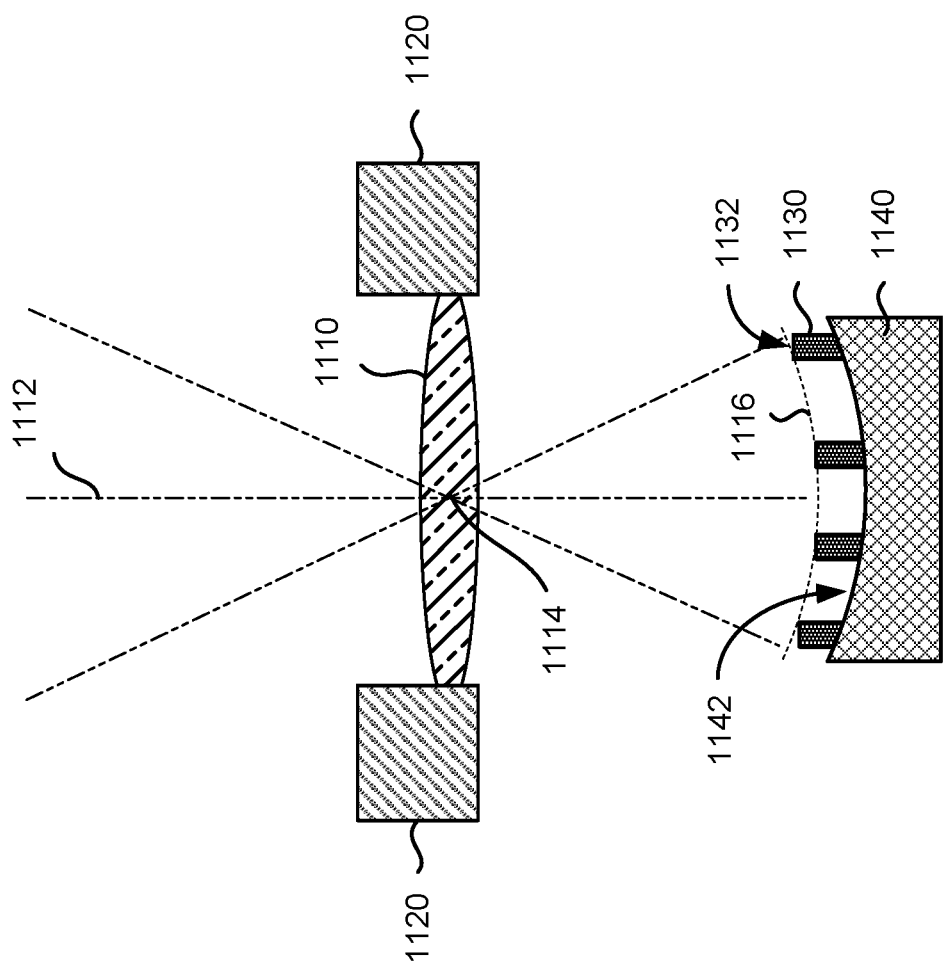
FIG. 11 illustrates a schematic cross-sectional view of a mounting configuration for optical components in a scanning lidar system that may take into account lens field curvatures according to some embodiments of the present invention.

FIG. 11 illustrates a schematic cross-sectional view of a mounting configuration for optical components in a scanning lidar system that may take into account lens field curvatures according to some embodiments. A lens 1110 may be mounted on a lens holder 1120. The lens 1110 may be characterized by an optical axis 1112 that passes through the lens center 1114, and a surface of best focus 1116 at a distance f from the lens 1110, f being the focal length of the lens 1110. The surface of best focus 1116 may be curved due to field curvature as discussed above, and may be referred to as a curved "focal plane" of the lens 1110. A plurality of laser sources 1130 may be mounted on a surface 1142 of a platform 1140 positioned approximately at the distance f from the lens 1110 along the optical axis 1112. In some embodiments, the surface 1142 of the platform 1140 may have a curved shape that substantially matches the surface of best focus 1116 of the lens 1110, so that an emission surface 1132 of each of the plurality of laser sources 1130 may lie approximately at the surface of best focus 1116 of the lens 1110. By mounting the plurality of laser sources 1130 in this configuration, laser pulses emitted by each laser source 1130 may be nearly perfectly collimated by the lens 1110 even if the laser source 1130 is positioned off from the optical axis 1112.

For example, assuming that the surface of best focus 1116 of the lens 1110 has a spherical shape, the surface 1142 of the platform 1140 may be configured to have a spherical shape so that an emitting surface 1132 of each laser source 1130 may lie substantially on the surface of best focus 1116 of the lens 1110. In cases where the surface of best focus 1116 of the lens 1110 has a curved shape other than spherical, such as ellipsoidal, conical, or wavy shaped, the surface 1142 of the platform 1140 may be shaped accordingly.

Similarly, the plurality of laser sources 1130 illustrated in FIG. 11 may be replaced by a plurality of photodetectors, so that a detection surface 1132 of each of the plurality of photodetectors 1130 may lie substantially at the surface of best focus 1116 of the lens 1110. In this configuration, laser pulses reflected off of objects may be brought into near perfect focus by the lens 1110 at the detection surface 1132 of each photodetector 1130 even if the photodetector 1130 is positioned off from the optical axis 1112 of the lens 1110.

In some embodiments, a plurality of laser sources and a plurality of photodetectors may share a same lens. The photodetectors may be placed closely adjacent to their corresponding lasers, such that some of the returning light is intercepted by the photodetector. Positions either to the side, in front of the laser, or behind the laser are possible. Because the laser beam typically has a narrow angular distribution and only utilizes the central portion of the lens, certain lens aberrations, such as spherical aberration, may be employed to advantage to direct some returning light, from the outer portions of the lens, to the photodetectors without overly disturbing the focus properties of the outgoing laser beam. In an alternative design, a beam splitter may be utilized to separate the outgoing and incoming beams. This may allow the lasers and detectors to share a conjugate point of the lens without physically overlapping in space.

Figure 12:
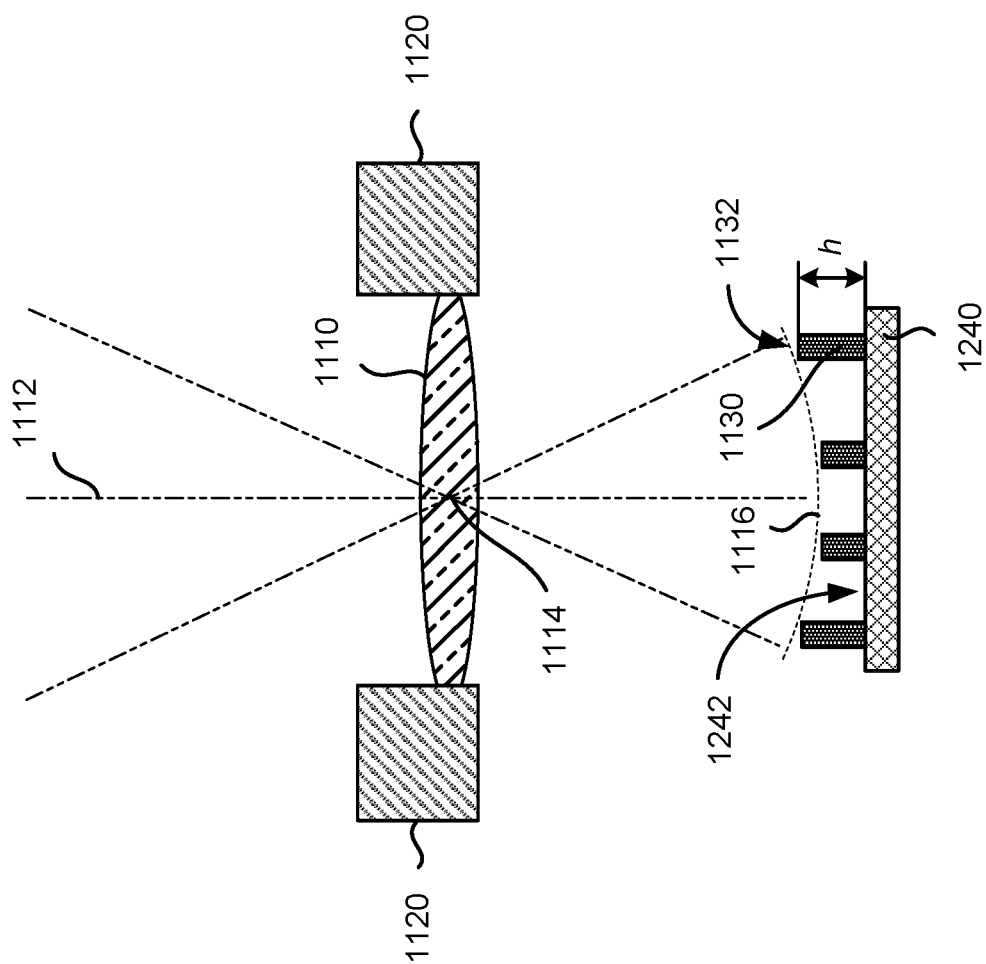
FIG. 12 illustrates a schematic cross-sectional view of a mounting configuration for optical components in a scanning lidar system according to some other embodiments of the present invention.

FIG. 12 illustrates a schematic cross-sectional view of a mounting configuration for optical components in a scanning lidar system according to some other embodiments. Here, a platform 1240 may have a planar surface 1242, and the plurality of laser sources (or photodetectors) 1130 may be mounted on the planar surface 1242 of the platform 1240. The plurality of laser sources 1130 may have varying heights h depending on their positions with respect to the optical axis 1112 of the lens 1110, such that an emitting surface 1132 of each respective laser source 1130 may lie substantially on the surface of best focus 1116 of the lens 1110. For example, for a spherical-shaped surface of best focus 1116, the laser sources 1130 farther away from the optical axis 1112 may have greater heights than those of the laser sources 1130 closer to the optical axis 1112, as illustrated in FIG. 12, so as to account for the curvature of the surface of best focus 1116. As an example, each laser source 1130 (or photodetector die) may be placed in a respective surface-mount package that places the die at a respective height h above the bottom of the package. The respective height h may vary depending on the position of the laser source 1130 (or photodetector die) with respect to the optical axis 1112. The packages are then subsequently soldered to a printed circuit board placed and positioned so that each die is correctly located at an image point of the lens 1110.

Figure 13:
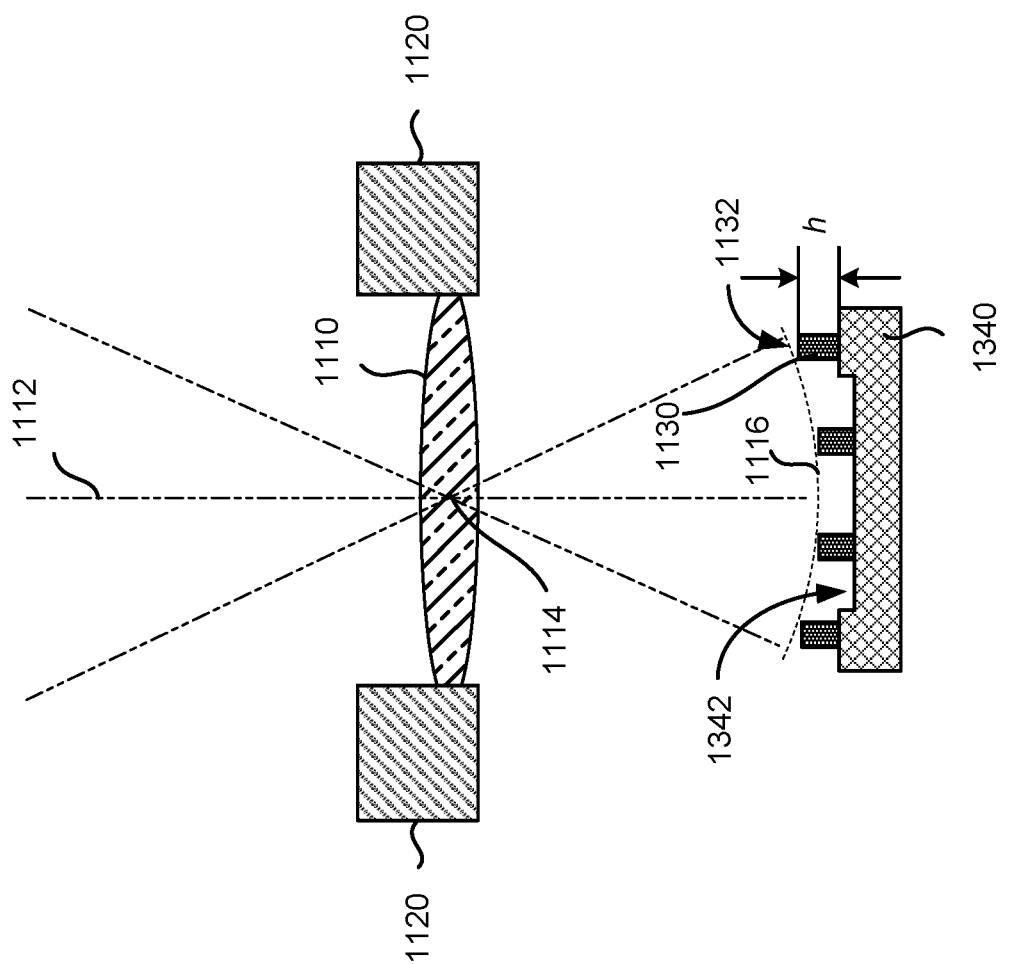
FIG. 13 illustrates a schematic cross-sectional view of a mounting configuration for optical components in a scanning lidar system according to some other embodiments of the present invention.

FIG. 13 illustrates a schematic cross-sectional view of a mounting configuration for optical components in a scanning lidar system according to some other embodiments. Here, the plurality of laser sources (or photodetectors) 1130 may have substantially the same height h. But the platform 1340 may have a surface 1342 with a stepped profile, such that an emitting surface 1132 of each respective laser source 1130 may lie substantially on the surface of best focus 1116 of the lens 1110.

Figure 14:
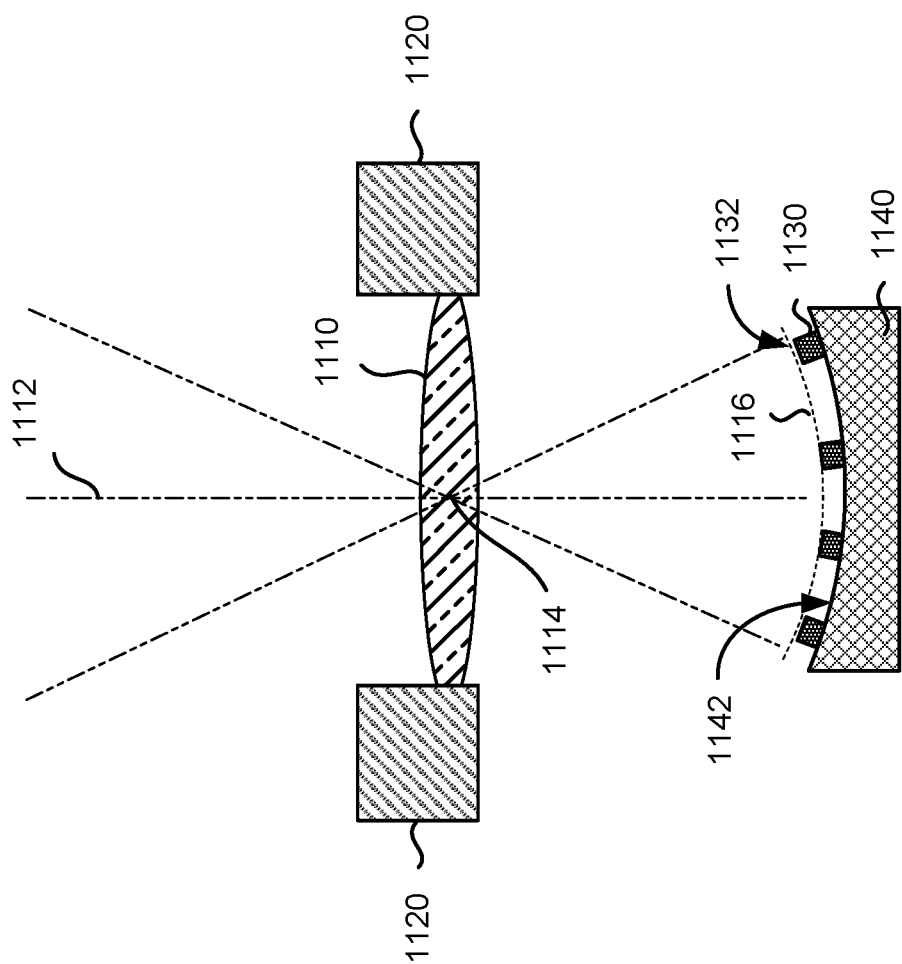
FIG. 14 illustrates a schematic cross-sectional view of a mounting configuration for optical components in a scanning lidar system according to some further embodiments of the present invention.

In some embodiments, laser sources and photodetectors may be mounted in a configuration that also takes into account possible distortion and vignetting of a lens. FIG. 14 illustrates a schematic cross-sectional view of a mounting configuration for optical components in a scanning lidar system according to some further embodiments. Similar to the mounting configuration illustrated in FIG. 11, a plurality of laser sources (or photodetectors) 1130 may be mounted on a curved surface 1142 of a platform 1140 so that the emission surface 1132 of each laser source 1130 lies substantially at the surface of best focus 1116 of the lens 1110. In addition, the plurality of laser sources 1130 are tilted at varying angles, such that a normal of the emission surface 1132 of each laser source 1130 may point substantially toward the lens center 1114. In this configuration, laser pulses emitted by laser sources 1130 that are positioned off from the optical axis 1112 may be collimated by the lens 1110 with minimal distortion and vignetting. It should be understood that the term "lens center" may refer to the optical center of the lens 1110. The lens center 1114 may be a geometrical center of the lens 1110 in cases where the lens 1110 can be characterized as a thin lens. Some compound lenses may be partially telecentric, in which case the preferred orientation of the normal to the laser emission or detector surface may not point toward the geometric center of the lens, but rather the optical center of the lens, which will typically be at an angle closer to the optical axis of the lens.

In some embodiments, a plurality of photodetectors may be mounted on a planar surface of the platform 1140. In some other embodiments, a plurality of photodetectors may be mounted on the curved surface 1142 of the platform 1140, so that the detection surface of each photodetector may point substantially toward the lens center 1114. Thus, image rays may impinge on the photodetectors substantially perpendicular to the detection surfaces of the photodetectors so that optimal detection efficiencies may be achieved.

Figure 15:
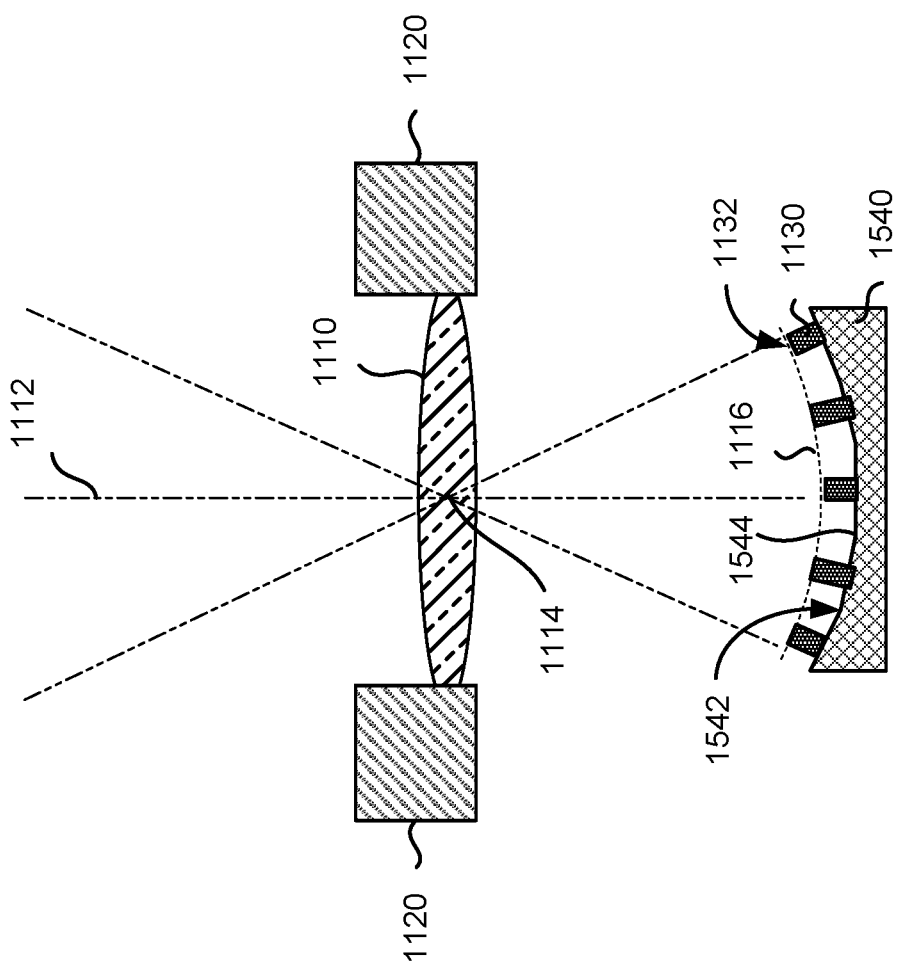
FIG. 15 illustrates a schematic cross-sectional view of a mounting configuration for optical components in a scanning lidar system according to some other embodiments of the present invention.

FIG. 15 illustrates a schematic cross-sectional view of a mounting configuration for optical components in a scanning lidar system according to some other embodiments. Here, a platform 1540 may have a surface 1542 that includes a plurality of facets with varying orientations, such that the normal of each facet 1544 substantially points toward the lens center 1114 of the lens 1110. Each of the plurality of laser sources may include a surface-emitting laser, such as a vertical-cavity surface-emitting laser (VCSEL), or a side-emitting laser mounted in a package in an orientation such that its light is emitted vertically with respect to the package.

Figure 16:
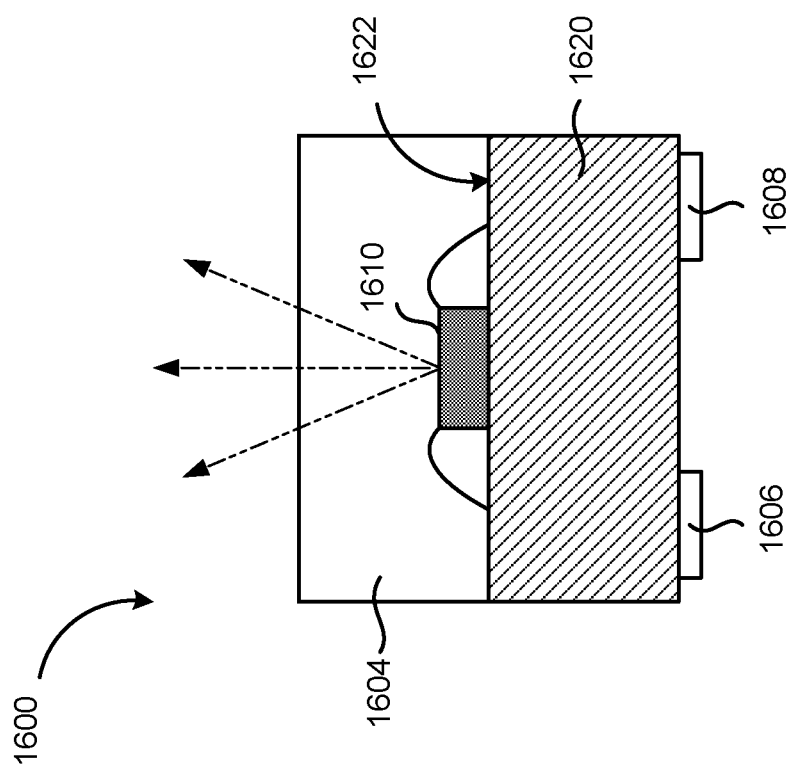
FIG. 16 shows a schematic cross-sectional view of a laser source 1600 that may be utilized according to some embodiments of the present invention.

FIG. 16 shows a schematic cross-sectional view of a laser source 1600 that may be utilized according to some embodiments. The laser source 1600 may include a surface-emitting laser chip 1610 mounted on a chip base 1620 with a leveled surface 1622. The laser source 1600 may be covered with a transparent cover 1604, and may include solder pads 1606 and 1608 on chip base 1620. The laser source 1600 may, for instance, be a package that is designed to be soldered to the surface of a printed circuit board.

Figure 17:
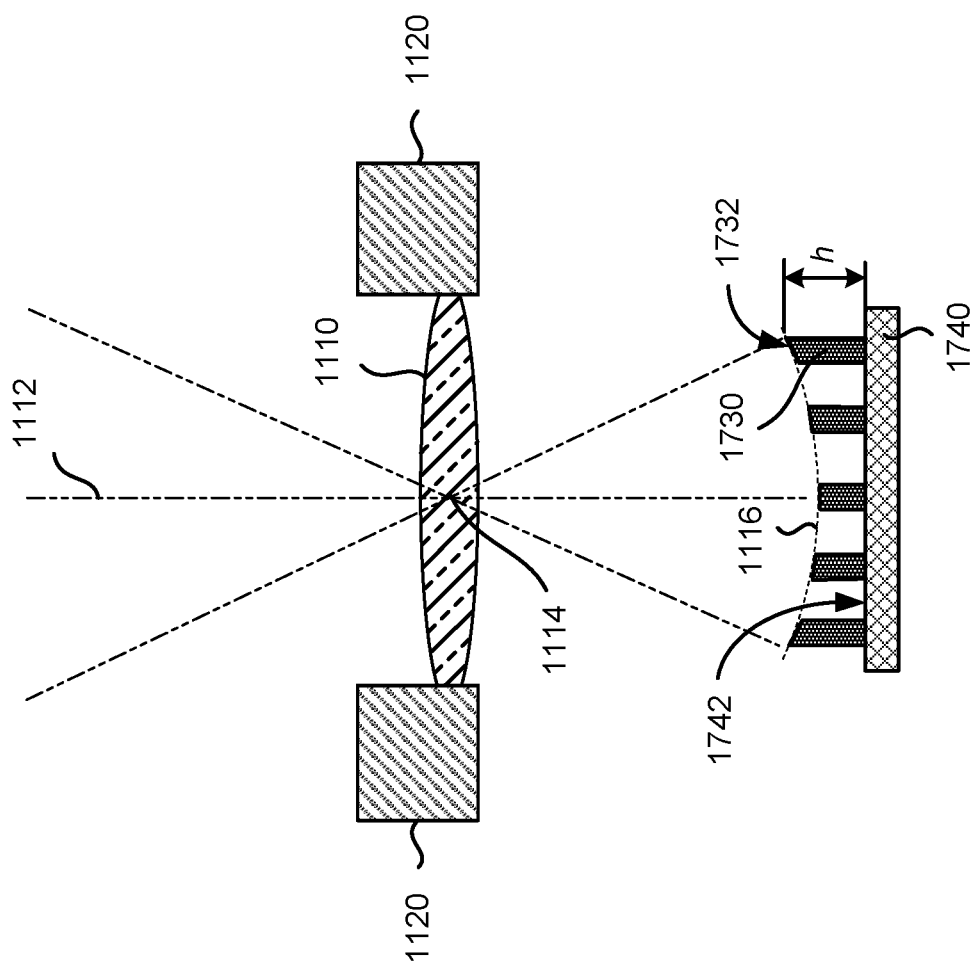
FIG. 17 illustrates a schematic cross-sectional view of a mounting configuration for optical components in a scanning lidar system according to some other embodiments of the present invention.

FIG. 17 illustrates a schematic cross-sectional view of a mounting configuration for optical components in a scanning lidar system according to some other embodiments. Here, a plurality of laser sources 1730 are mounted on a platform 1740 with a planar surface 1742. The plurality of laser sources 1730 may have varying heights h and varying surface slanting angles depending on the position of each respective laser source 1730 with respect to the optical axis 1112, such that the normal of the emission surface 1732 of each respective laser source 1730 points substantially toward the lens center 1114.

Figure 18B:
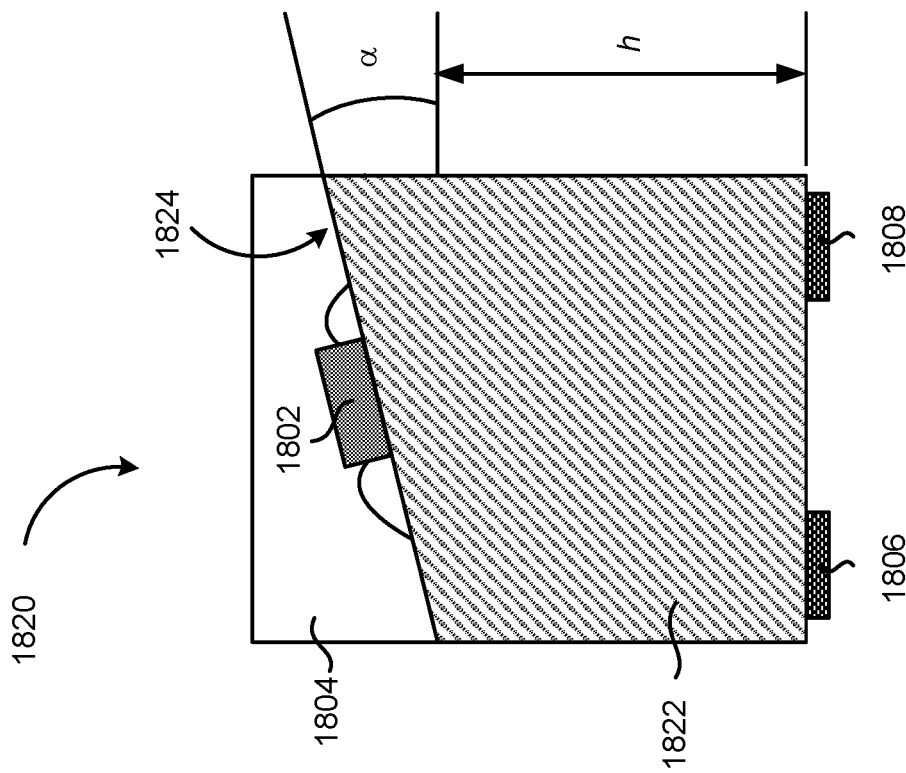
FIGS. 18A and 18B show schematic cross-sectional views of some exemplary laser sources that may be utilized according to some embodiments of the present invention.
Figure 18A:
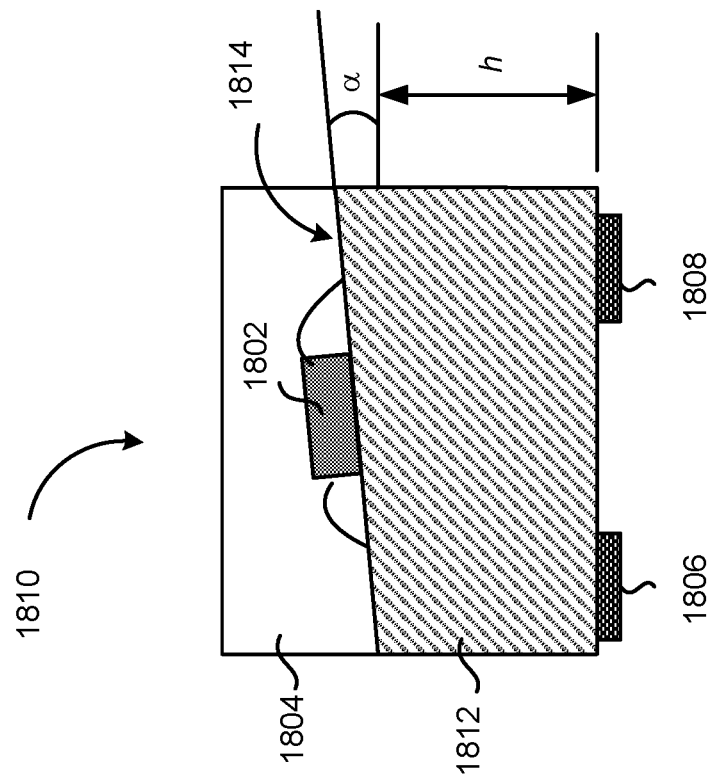

FIGS. 18A and 18B show schematic cross-sectional views of some exemplary laser sources 1810 and 1820 that may be utilized according to some embodiments. Each of the laser sources 1810 and 1820 may include a surface-emitting laser chip 1802 surface-mounted on a chip base 1812 or 1822 with a slanted surface 1814 or 1824. The surface slanting angle α and the base height h can vary depending on the position of the laser source with respect to the optical axis as discussed above. For example, a laser source positioned closer to the optical axis 1112 may have a relatively smaller slanting angle α as illustrated in FIG. 18A, and a laser source positioned farther away from the optical axis 1112 may have a relatively larger slanting angle α as illustrated in FIG. 18B. The laser source 1810 or 1820 may be covered with a transparent cover 1804, and may include solder pads 1806 and 1808 on chip base 1812 or 1822. The laser source 1810 or 1820 may, for instance, be a package that is designed to be soldered to the surface of a printed circuit board. In some other embodiments, a side-emitting laser chip may also be used, in which case the laser chip may be oriented in the package such that its light is emitted perpendicular to the surface 1814 or 1824.

Figure 19:
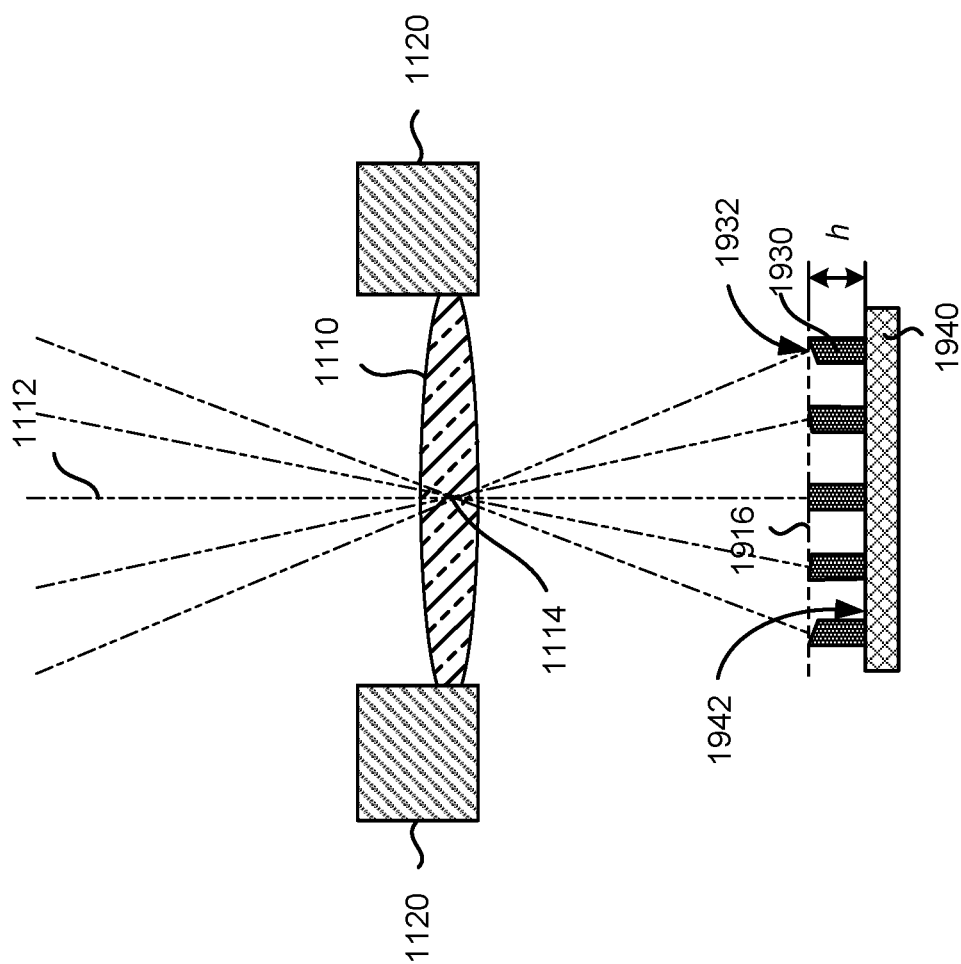
FIG. 19 illustrates a schematic cross-sectional view of a mounting configuration for optical components in a scanning lidar system according to some other embodiments of the present invention.

FIG. 19 illustrates a schematic cross-sectional view of a mounting configuration for optical components in a scanning lidar system according to some other embodiments. Here, a plurality of laser sources 1930 are mounted on a platform 1940 with a substantially planar surface 1942. The plurality of laser sources 1930 may have substantially the same height h but varying surface slanting angles depending on the position of each respective laser source 1930 with respect to the optical axis 1112 of the lens, such that the normal of the emission surface 1132 of each respective laser source 1930 points substantially toward the lens center 1114. As illustrated, the emission surface 1932 of each respective laser source 1930 may lie substantially at a focal plane 1916 of the lens 1110.

Figure 20:
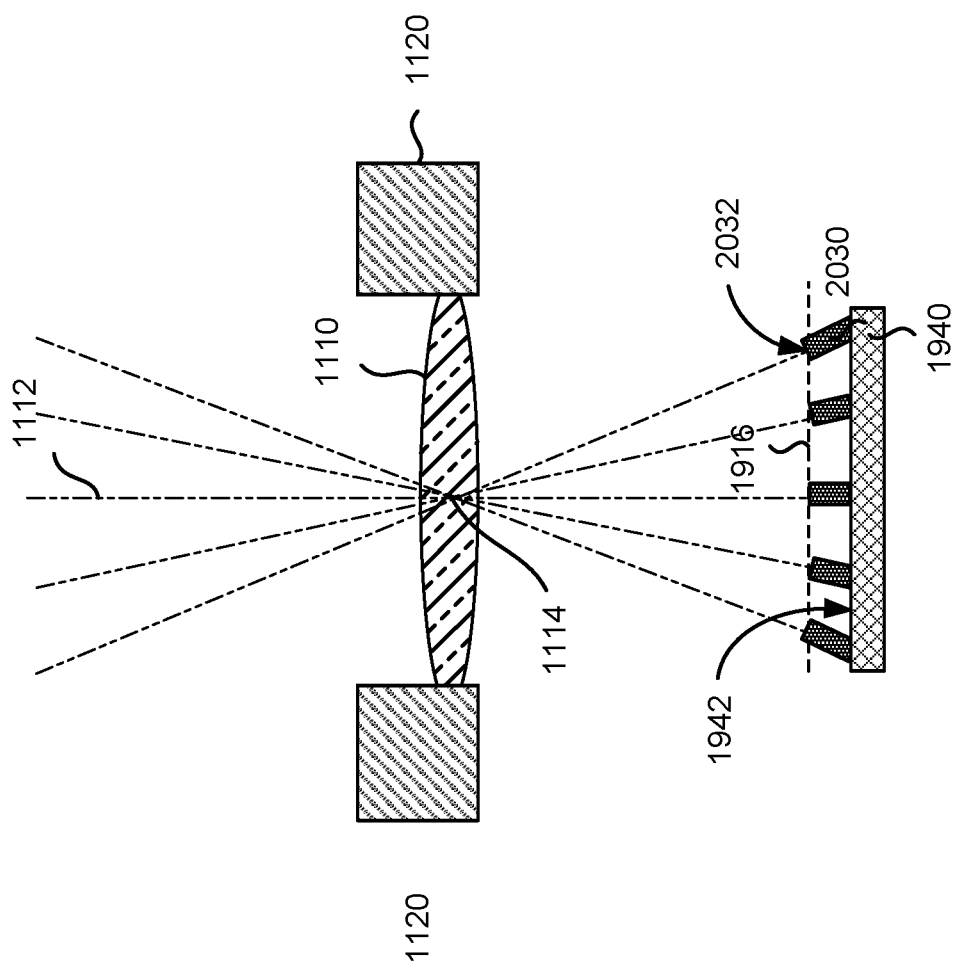
FIG. 20 illustrates a schematic cross-sectional view of a mounting configuration for optical components in a scanning lidar system according to some other embodiments of the present invention.

FIG. 20 illustrates a schematic cross-sectional view of a mounting configuration for optical components in a scanning lidar system according to some other embodiments. Here, a plurality of laser sources 2030 are mounted on a platform 1940 with a substantially planar surface 1942. Each of the plurality of laser sources 2030 may be tilted at a respective tilting angle, such that the normal of the emission surface 2032 of each respective laser source 2030 points substantially toward the lens center 1114. As illustrated, the emission surface 2032 of each respective laser source 2030 may lie substantially at a focal plane 1916 of the lens 1110.

Figure 21:
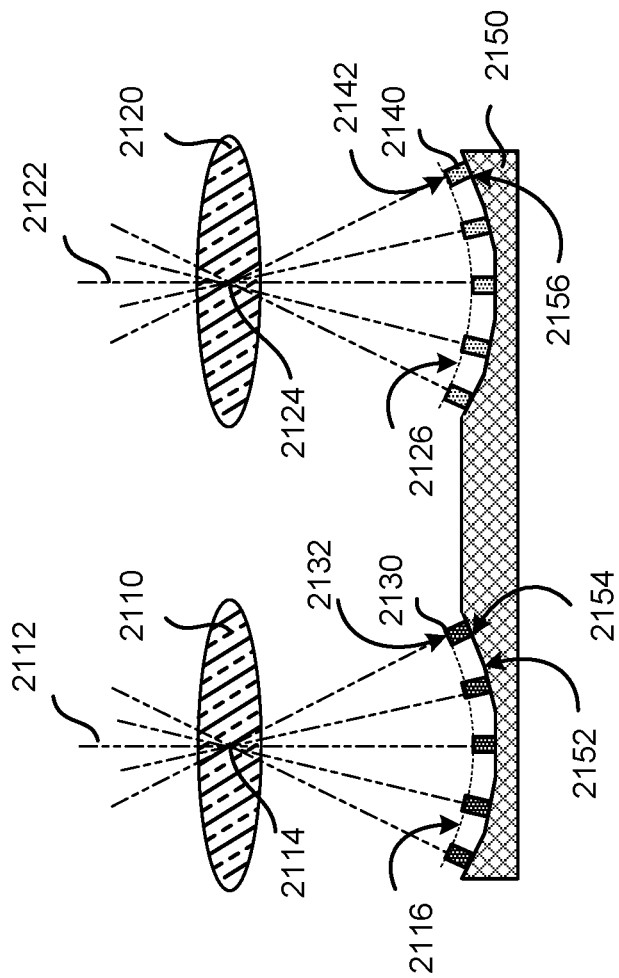
FIG. 21 illustrates a schematic cross-sectional view of a mounting configuration for optical components in a scanning lidar system according to some other embodiments of the present invention.

FIG. 21 illustrates a schematic cross-sectional view of a mounting configuration for optical components in a scanning lidar system according to some other embodiments. The lidar system may include a first lens 2110 and a second lens 2120. The first lens 2110 has a lens center 2114, and is characterized by a first optical axis 2112 along a first direction and a first surface of best focus 2116. The second lens 2120 has a lens center 2124, and is characterized by a second optical axis 2122 substantially parallel to the first optical axis 2112 and a second surface of best focus 2126.

The lidar system may further include a plurality of surface-emitting laser sources 2130 and a plurality of photodetectors 2140 mounted on a platform 2150. In some embodiments, the platform 2150 is a printed circuit board. The platform 2150 is spaced apart from the first lens 2110 and the second lens 2120 along the first direction. In some embodiments, the platform 2150 may have a surface 2152 (extending substantially in the direction perpendicular to the paper, i.e., the Z direction) that includes a plurality of first facets 2154. Each surface-emitting laser source 2130 may be mounted on a respective first facet 2154. The plurality of first facets 2154 may be positioned and oriented such that an emission surface 2132 of each respective laser source 2130 lies substantially at the first surface of best focus 2116 of the first lens 2110 and its normal points substantially toward the lens center 2114 of the first lens 2110. The surface 2152 of the platform 2150 may further include a plurality of second facets 2156. Each photodetector 2140 may be mounted on a respective second facet 2156. The plurality of second facets 2156 may be positioned such that a detection surface 2142 of each respective photodetector 2140 lies at a respective position on the second surface of best focus 2126 of the second lens 2120 that is optically conjugate with a respective position of a corresponding laser source 2130. The plurality of second facets 2156 may be oriented such that the normal of the detection surface 2142 may point substantially toward the lens center 2124 of the second lens 2120.

Figure 22:
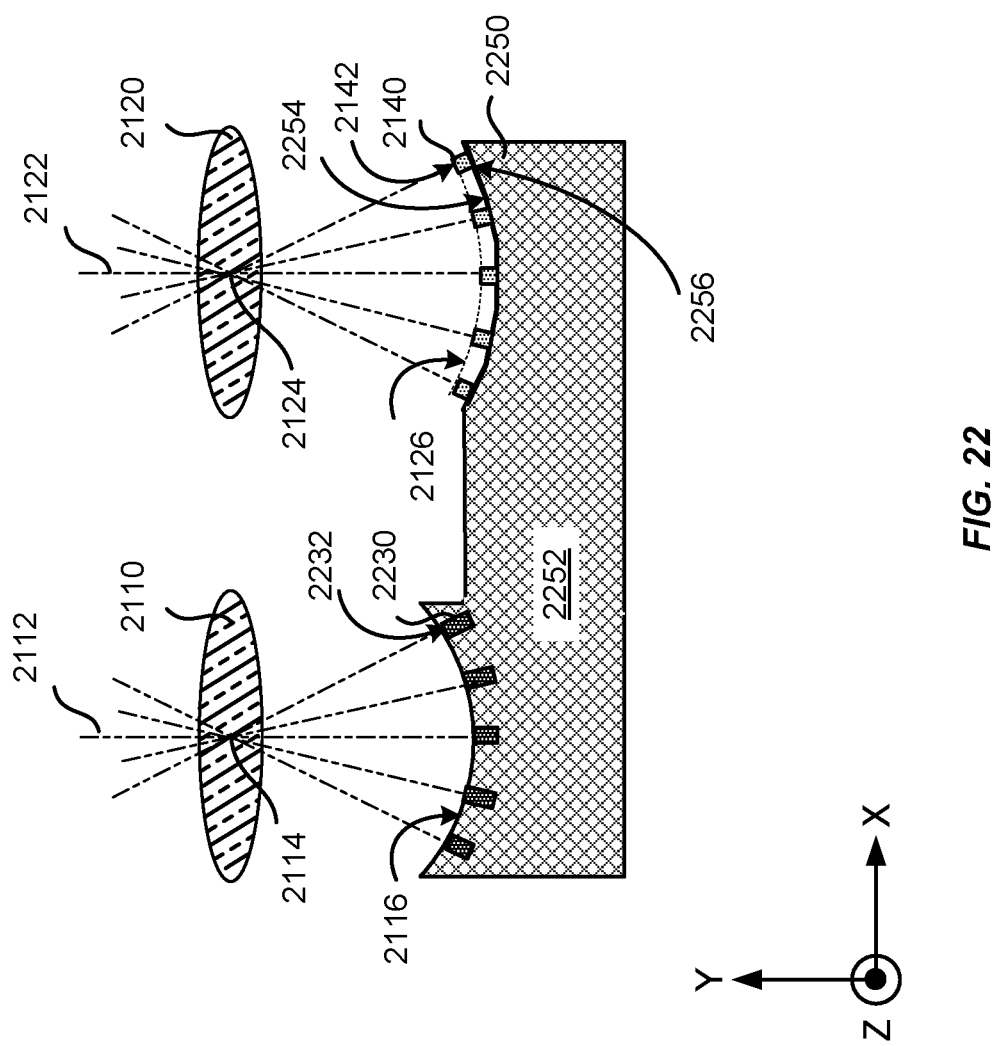
FIG. 22 illustrates a schematic top view of a mounting configuration for optical components in a scanning lidar system according to some other embodiments of the present invention.
Figure 23:
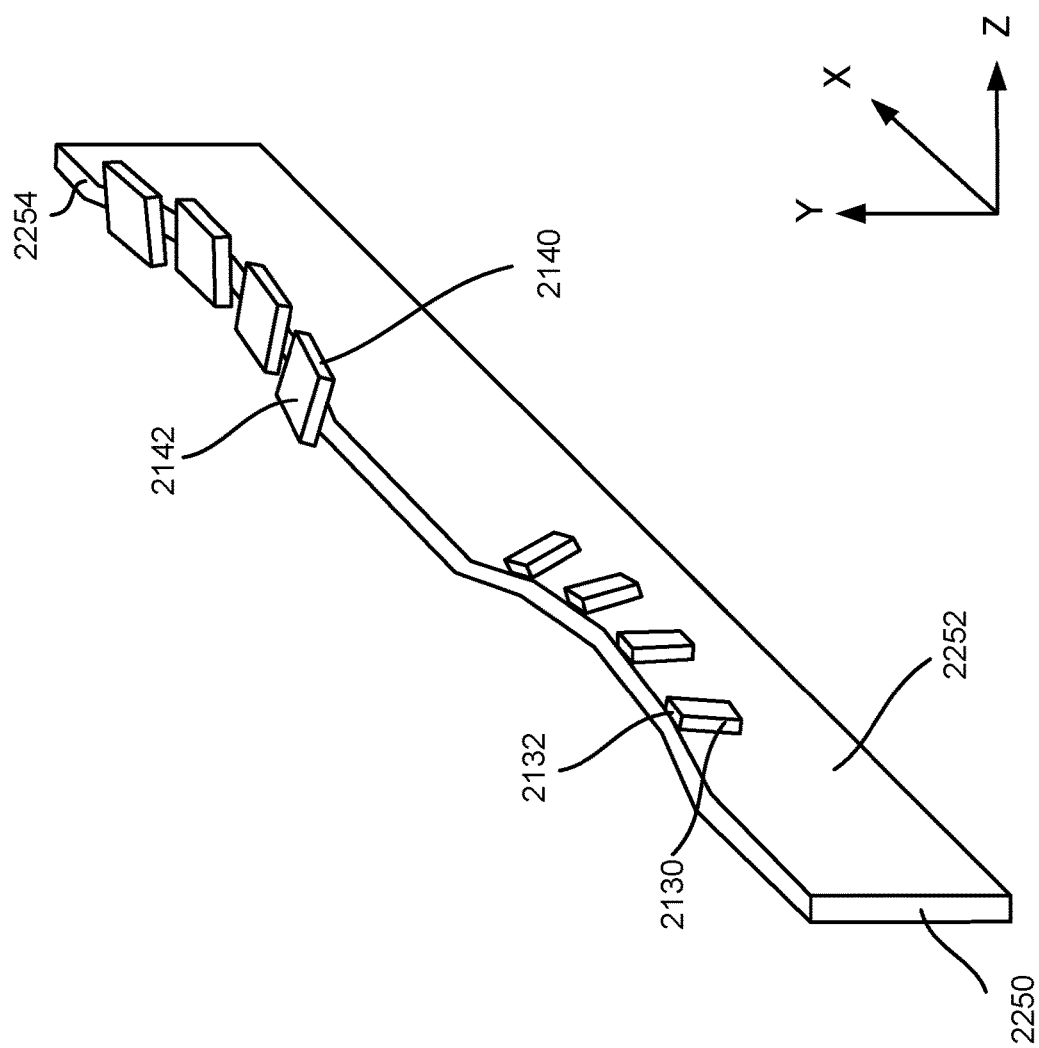
FIG. 23 shows a schematic perspective view of the platform with the plurality of laser sources and the plurality of photodetectors mounted thereon as illustrated in FIG. 22.

FIG. 22 illustrates a schematic top view of a mounting configuration for optical components in a scanning lidar system according to some other embodiments. Here, a platform 2250 (e.g., a printed circuit board) may have a planar surface 2252 in the X-Y plane (i.e., in the plane of the paper), and an edge surface 2254 extending in the Z direction (i.e., in a direction perpendicular to the paper). FIG. 23 shows a schematic perspective view of the platform 2250 with the plurality of laser sources 2130 and the plurality of photodetectors 2140 mounted thereon as illustrated in FIG. 22. Each of the plurality of edge-emitting laser sources 2230 may comprise an edge-emitting laser source. The plurality of laser sources 2230 may be disposed on the planar surface 2252 of the platform 2250 as an array along an arc such that an emission surface 2232 of each respective laser source 2230 lies substantially at the surface of best focus 2116 of the first lens 2110, and its normal pointing substantially toward the lens center 2114 of the first lens 2110. The edge surface 2254 of the platform 2250 may include a plurality of facets 2256. Each photodetector 2140 may be mounted on a respective facet 2256 of the edge surface 2254. The plurality of facets 2256 may be positioned such that a detection surface 2142 of each respective photodetector 2140 lies at a respective position on the surface of best focus 2126 of the second lens 2120 that is conjugate with a respective position of a corresponding laser source 2230. The plurality of second facets 2256 may be oriented such that the normal of the detection surface 2142 may point substantially toward the lens center 2124 of the second lens 2120.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A lidar system comprising:
a lens having a lens center and characterized by an optical axis;
a platform separated from the lens along the optical axis, wherein the platform is configured to be translated in a plane substantially perpendicular to the optical axis of the lens, thereby translating an array of laser sources and an array of photodetectors relative to the lens;
the array of laser sources mounted on the platform, wherein each respective laser source of the array of laser sources has an emission surface and is positioned at a respective laser position, and a normal of the emission surface of each respective laser source points substantially toward the lens center; and
the array of photodetectors mounted on the platform, wherein each photodetector of the array of photodetectors is positioned at a respective photodetector position that is optically conjugate with a respective laser position of a corresponding laser source.

2. The lidar system of claim 1 wherein the lens is characterized by a focal plane, and the emission surface of each laser source lies substantially at the focal plane.

3. The lidar system of claim 1 wherein the lens is characterized by a curved surface of best focus, and the emission surface of each laser source lies substantially at the curved surface of best focus.

4. The lidar system of claim 1 wherein each photodetector of the array of photodetectors has a detection surface, and a normal of the detection surface of each respective photodetector points substantially toward the lens center.

5. The lidar system of claim 4 wherein the lens is characterized by a focal plane, and the detection surface of each respective photodetector lies substantially at the focal plane.

6. The lidar system of claim 4 wherein the lens is characterized by a curved surface of best focus, and the detection surface of each photodetector lies substantially at the curved surface of best focus.

7. The lidar system of claim 1 wherein each respective laser source comprises a laser chip surface-mounted on a surface of a chip base, the surface of the chip base has a slanting angle that depends on the respective laser position of the respective laser source with respect to the optical axis of the lens so that the normal of the emission surface of each respective laser source points substantially toward the lens center.

8. The lidar system of claim 7 wherein the chip base has a height that depends on the respective laser position of the respective laser source with respect to the optical axis of the lens.

9. A lidar system comprising:
a lens having a lens center, the lens characterized by an optical axis and a surface of best focus;
a platform separated from the lens along the optical axis, wherein the platform is configured to be translated in a plane substantially perpendicular to the optical axis of the lens, thereby translating an array of laser sources and an array of photodetectors relative to the lens;
the array of laser sources mounted on the platform, wherein:
each respective laser source of the array of laser sources has an emission surface and is positioned at a respective laser position;
a normal of the emission surface of each respective laser source points substantially toward the lens center; and
the emission surface of each laser source lies substantially at the surface of best focus; and
the array of photodetectors mounted on the platform, wherein each photodetector of the array of photodetectors is positioned at a respective photodetector position that is optically conjugate with a respective laser position of a corresponding laser source.

10. The lidar system of claim 8 wherein the surface of best focus is curved.

11. The lidar system of claim 10 wherein each laser source of the array of laser sources comprises a surface-emitting laser source, and the array of laser sources are mounted on a curved surface of the platform so that the emission surface of each laser source lies substantially at the surface of best focus of the lens.

12. The lidar system of claim 10 wherein each respective laser source comprises a laser chip surface-mounted on a surface of a chip base, the surface of the chip base has a slanting angle that depends on the respective laser position of the respective laser source with respect to the optical axis of the lens so that the normal of the emission surface of each respective laser source points substantially toward the lens center.

13. The lidar system of claim 12 wherein the chip base has a height that depends on the respective laser position of the respective laser source with respect to the optical axis of the lens.

14. The lidar system of claim 9 wherein each photodetector of the array of photodetectors has a detection surface, and a normal of the detection surface of each respective photodetector points substantially toward the lens center.

15. The lidar system of claim 14 wherein the detection surface of each respective photodetector lies substantially at the surface of best focus.

16. The lidar system of claim 15 wherein the surface of best focus is curved, and the array of photodetectors are mounted on a curved surface of the platform so that the detection surface of each respective photodetector lies substantially at the surface of best focus of the lens.

* * * * *